(12) United States Patent
Toyama et al.

(10) Patent No.: US 7,773,798 B2
(45) Date of Patent: Aug. 10, 2010

(54) MODELING SYSTEM, AND MODELING METHOD AND PROGRAM

(75) Inventors: Osamu Toyama, Kakogawa (JP); Toshio Norita, Mishima-gun (JP)

(73) Assignee: Konica Minolta Holdings, Inc., Tokyo (JP)

( * ) Notice: Subject to any disclaimer, the term of this patent is extended or adjusted under 35 U.S.C. 154(b) by 959 days.

(21) Appl. No.: 11/529,660

(22) Filed: Sep. 28, 2006

(65) Prior Publication Data

US 2007/0075996 A1 Apr. 5, 2007

(30) Foreign Application Priority Data

Oct. 3, 2005 (JP) .............................. 2005-290012

(51) Int. Cl.
*G06K 9/00* (2006.01)

(52) U.S. Cl. ........................ 382/154; 382/118; 382/181

(58) Field of Classification Search ................. 382/103, 382/107, 118, 154
See application file for complete search history.

(56) References Cited

U.S. PATENT DOCUMENTS

| 6,580,821 B1 * | 6/2003 | Roy ........................... 382/154 |
| 2002/0013683 A1 * | 1/2002 | Toyama et al. ................. 703/2 |

FOREIGN PATENT DOCUMENTS

JP 2001-283252 A 10/2001

* cited by examiner

*Primary Examiner*—Tom Y Lu
(74) *Attorney, Agent, or Firm*—Sidley Austin LLP

(57) ABSTRACT

The present invention provides a modeling technique with improved modeling accuracy. A modeling system obtains a plurality of pieces of measurement data by measuring an object a plurality of times, and obtains a standard model as a standard three-dimensional model of the object. The modeling system deforms the standard model so as to optimize a predetermined evaluation function including an evaluation element on the plurality of pieces of measurement data, thereby generating a three-dimensional model of the object.

18 Claims, 21 Drawing Sheets

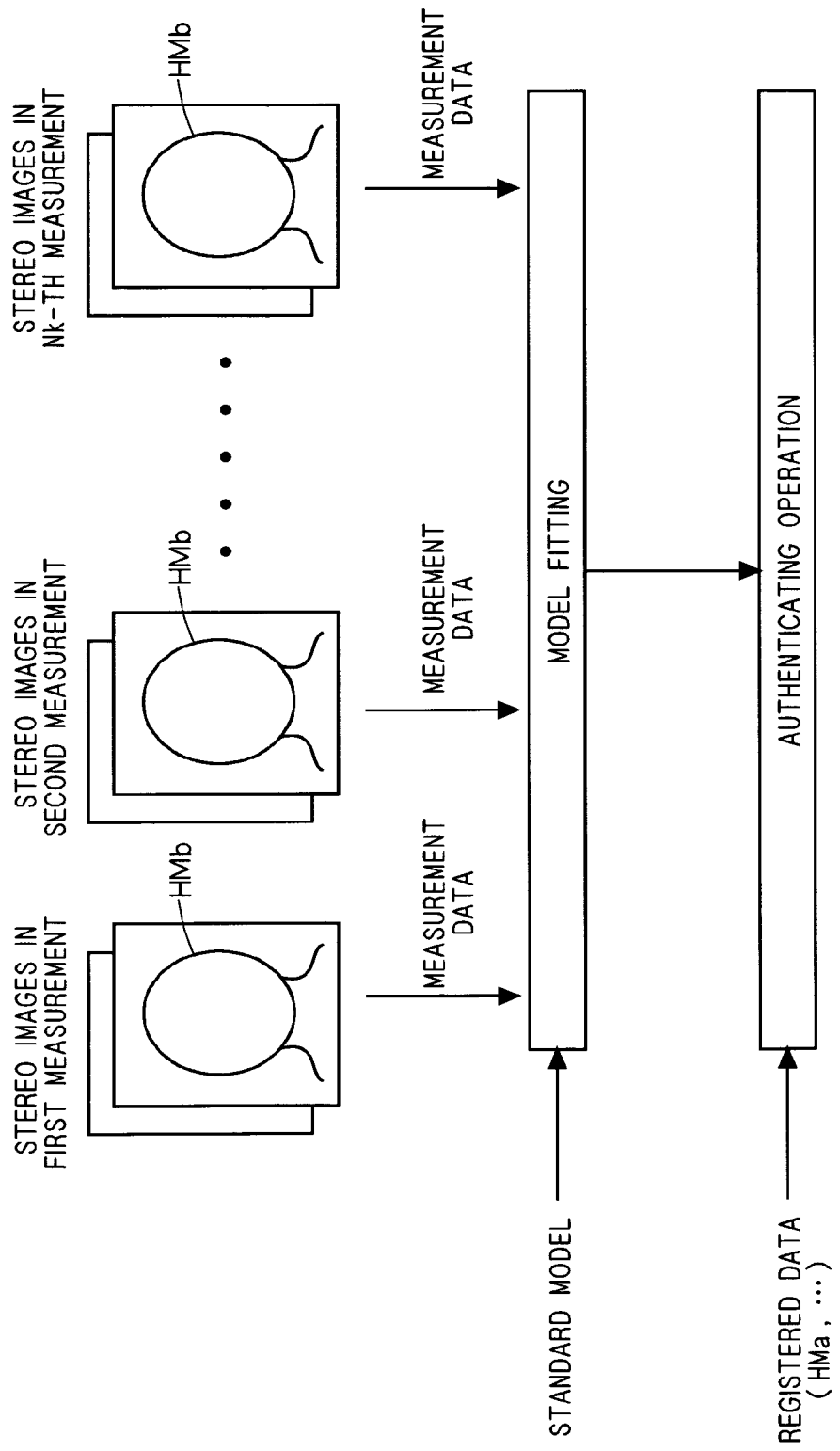

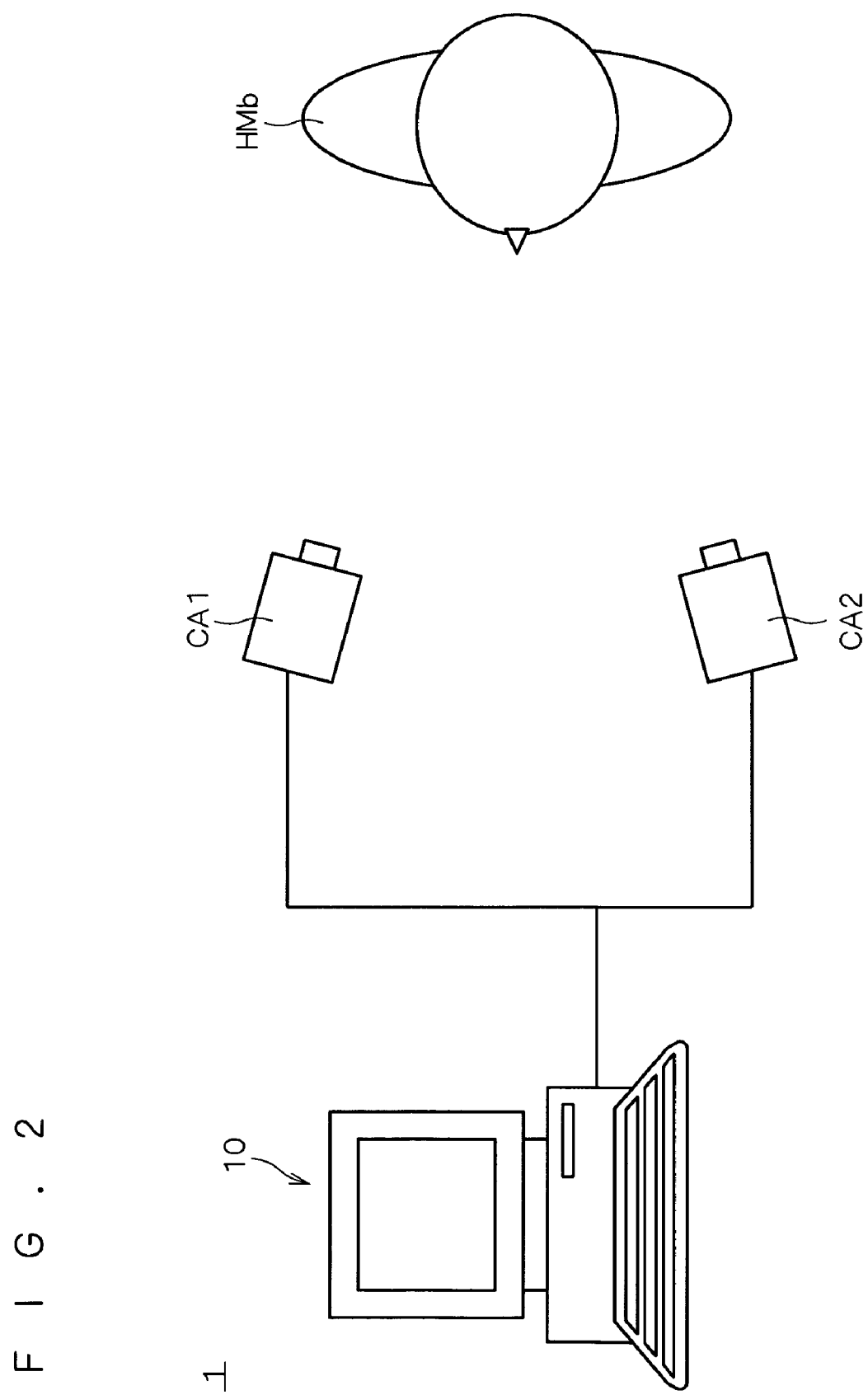

F I G . 3
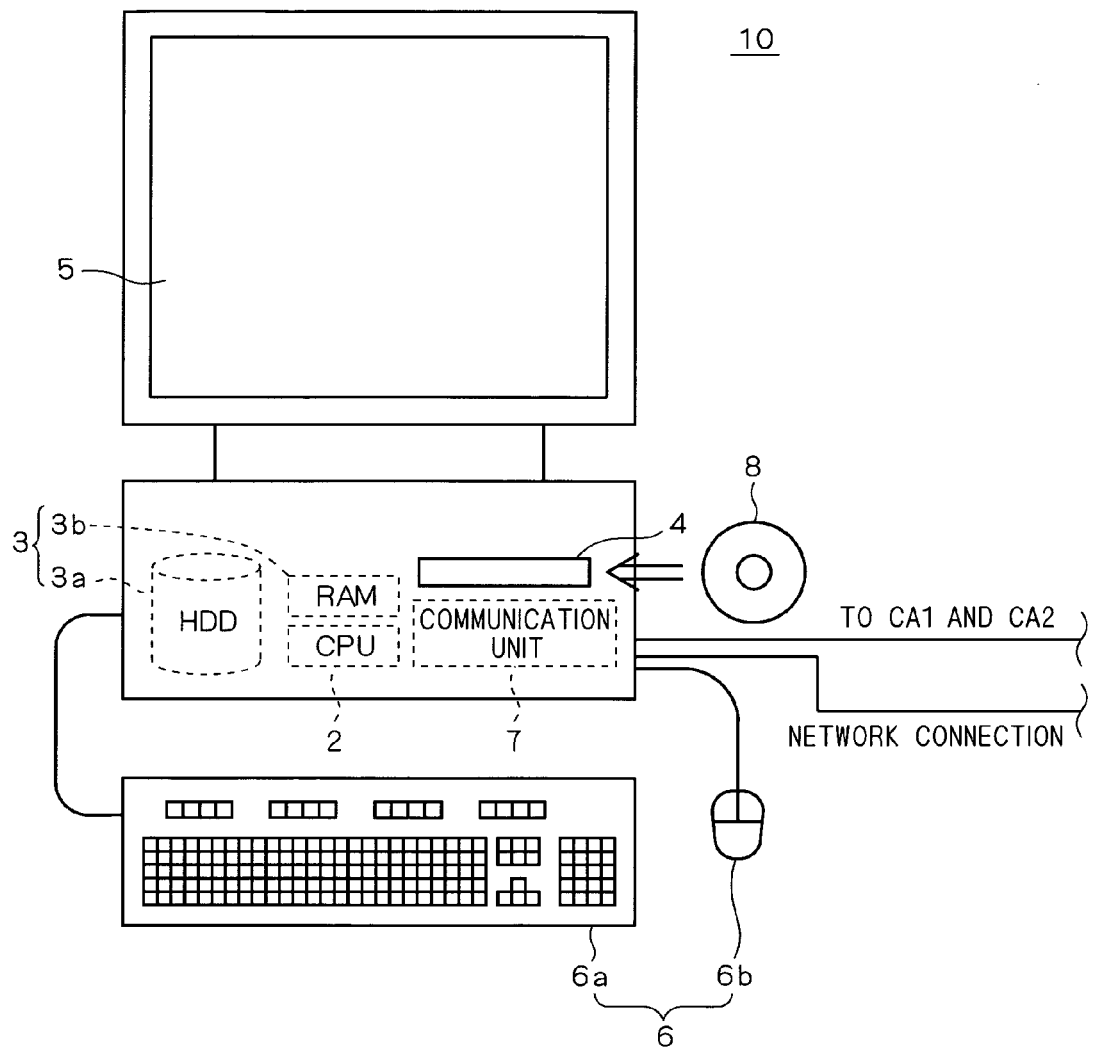

FIG. 16
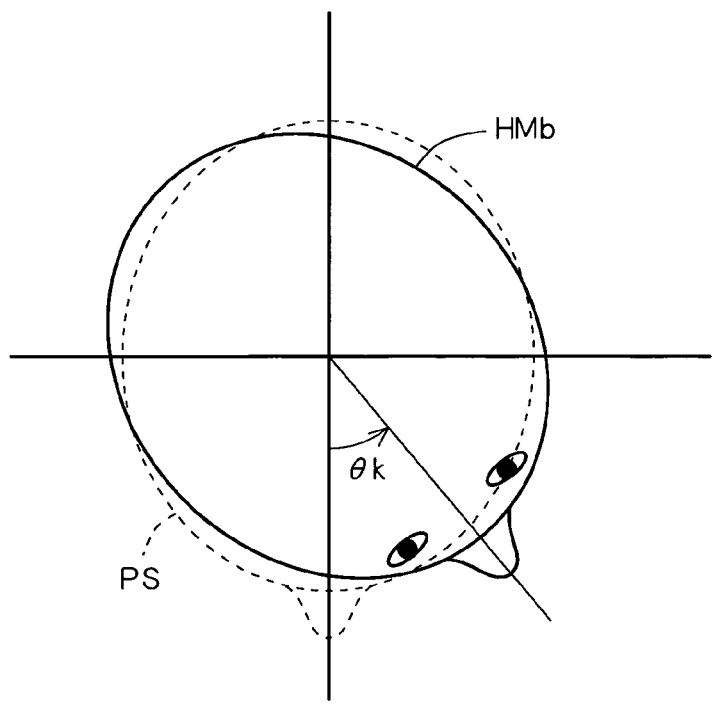
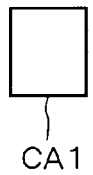
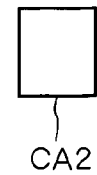

F I G . 1 7
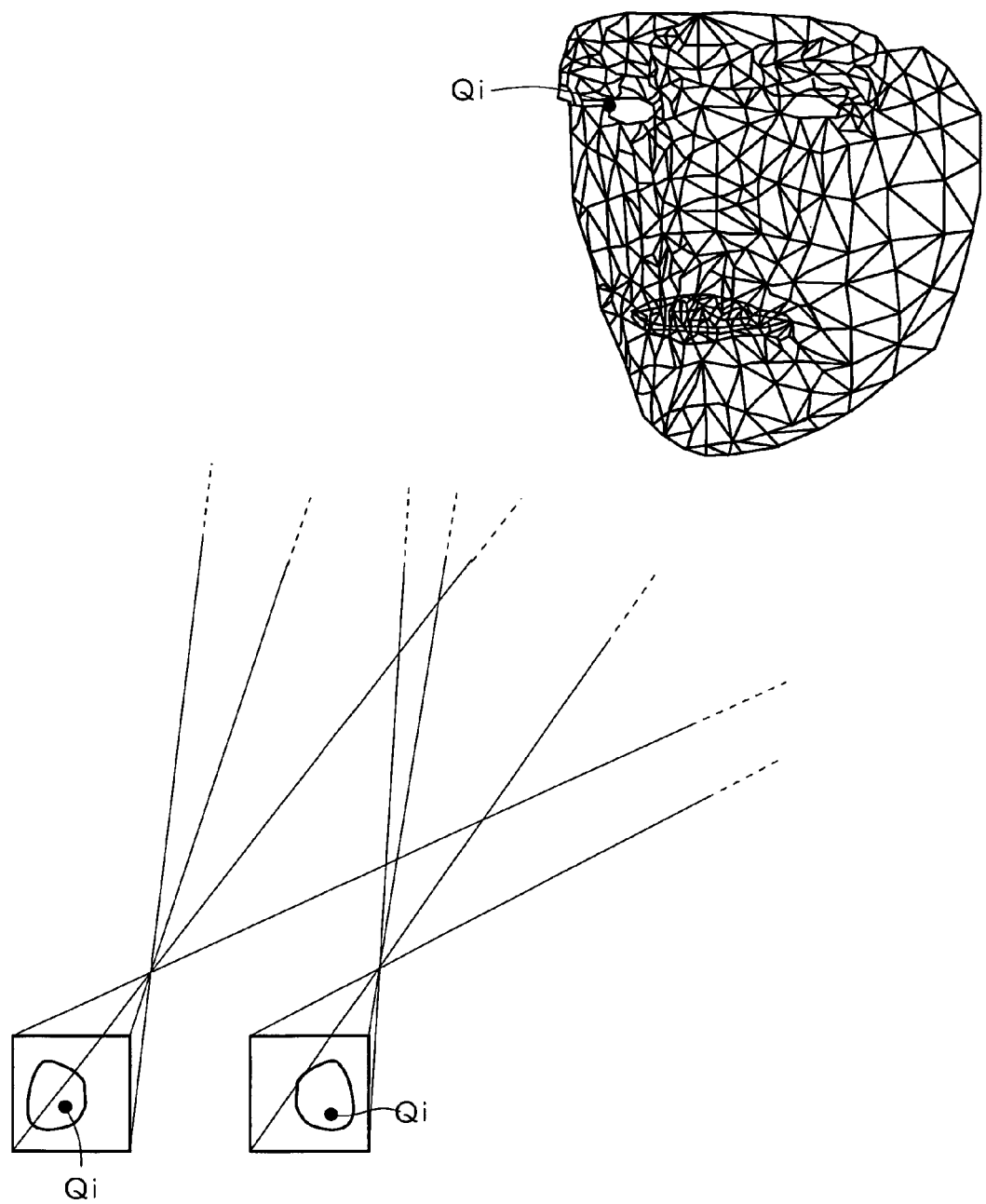

F I G . 1 8

| | | Qi | | |
|---|---|---|---|---|
| S(x-2,y-2) | S(x-1,y-2) | S(x,y-2) | S(x+1,y-2) | S(x+2,y-2) |
| S(x-2,y-1) | S(x-1,y-1) | S(x,y-1) | S(x+1,y-1) | S(x+2,y-1) |
| S(x-2,y) | S(x-1,y) | S(x,y) | S(x+1,y) | S(x+2,y) |
| S(x-2,y+1) | S(x-1,y+1) | S(x,y+1) | S(x+1,y+1) | S(x+2,y+1) |
| S(x-2,y+2) | S(x-1,y+2) | S(x,y+2) | S(x+1,y+2) | S(x+2,y+2) |

FIG. 25
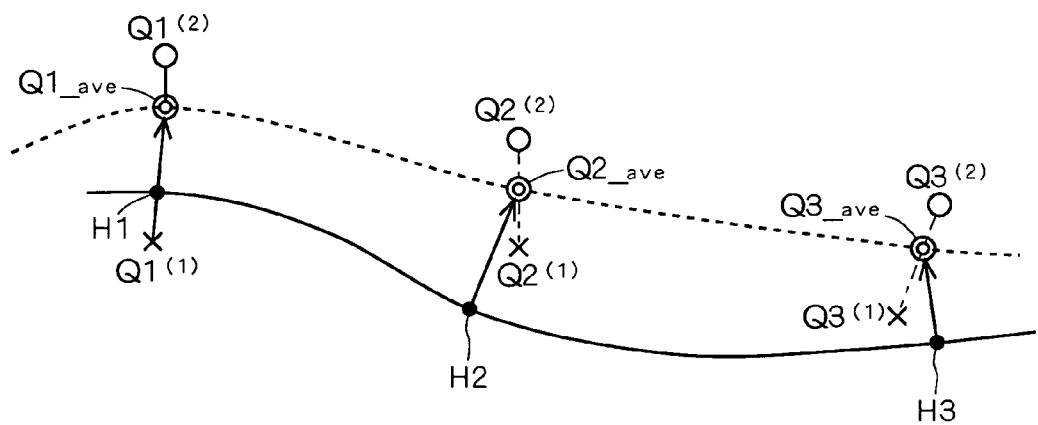
FIG. 26
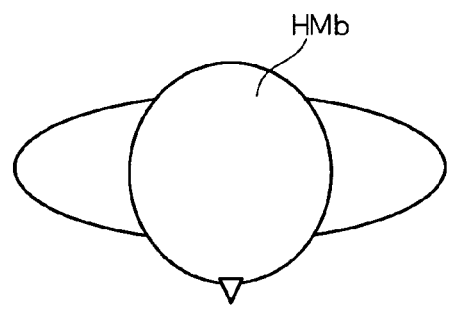
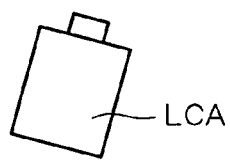
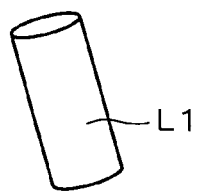

MODELING SYSTEM, AND MODELING METHOD AND PROGRAM

This application is based on application No. 2005-290012 filed in Japan, the contents of which are hereby incorporated by reference.

BACKGROUND OF THE INVENTION

1. Field of the Invention

The present invention relates to a technique for modeling an object.

2. Description of the Background Art

There is a model fitting method of preparing a standard model as a standard three-dimensional model of a target object at the time of generating a model of the object, and modifying the standard model in accordance with measured three-dimensional data.

In such a model fitting method, for example, measurement data of an object is obtained by performing a measuring operation for capturing, for example, images by using two cameras (stereoscopic measurement) and a model deforming operation is performed so as to adjust a standard model in accordance with the measurement data, thereby generating a model of the object.

In some cases, however, the accuracy in the measurement of an object once by the stereoscopic measurement as described above is insufficient depending on the image capture conditions (measurement conditions) and the like. At the time of performing the modeling on the basis of the object measurement of insufficient accuracy, a problem occurs such that sufficient modeling accuracy cannot be obtained.

SUMMARY OF THE INVENTION

The present invention is directed to provide a modeling technique capable of improving modeling accuracy.

In order to achieve the object, according to an aspect of the invention, a modeling system includes: a standard model obtaining unit for obtaining a standard model as a standard three-dimensional model of an object; a data obtaining unit for obtaining a plurality of pieces of measurement data by measurement of a plurality of times performed on the object; and a model generating unit for generating a three-dimensional model of the object by deforming the standard model so as to optimize a predetermined evaluation function including an evaluation element on the plurality of pieces of measurement data.

The present invention is also directed to a modeling method and a program.

BRIEF DESCRIPTION OF THE DRAWINGS

FIG. 1 is a conceptual diagram showing an outline of processes in a first embodiment.

FIG. 2 is a configuration diagram showing a face authentication system (modeling apparatus).

FIG. 3 is a diagram showing a configuration outline of a controller.

FIG. 16 is a diagram of a face seen from above.

FIG. 17 is a diagram showing feature points.

FIG. 18 is a diagram showing pixels around a feature point in an image.

FIG. 25 is a diagram showing a modification in which a weighted average point Qj_ave is obtained in advance.

FIG. 26 is a diagram showing a three-dimensional shape measuring device using an optical cutting method.

DESCRIPTION OF THE PREFERRED EMBODIMENTS

1. Outline

Figure 4:
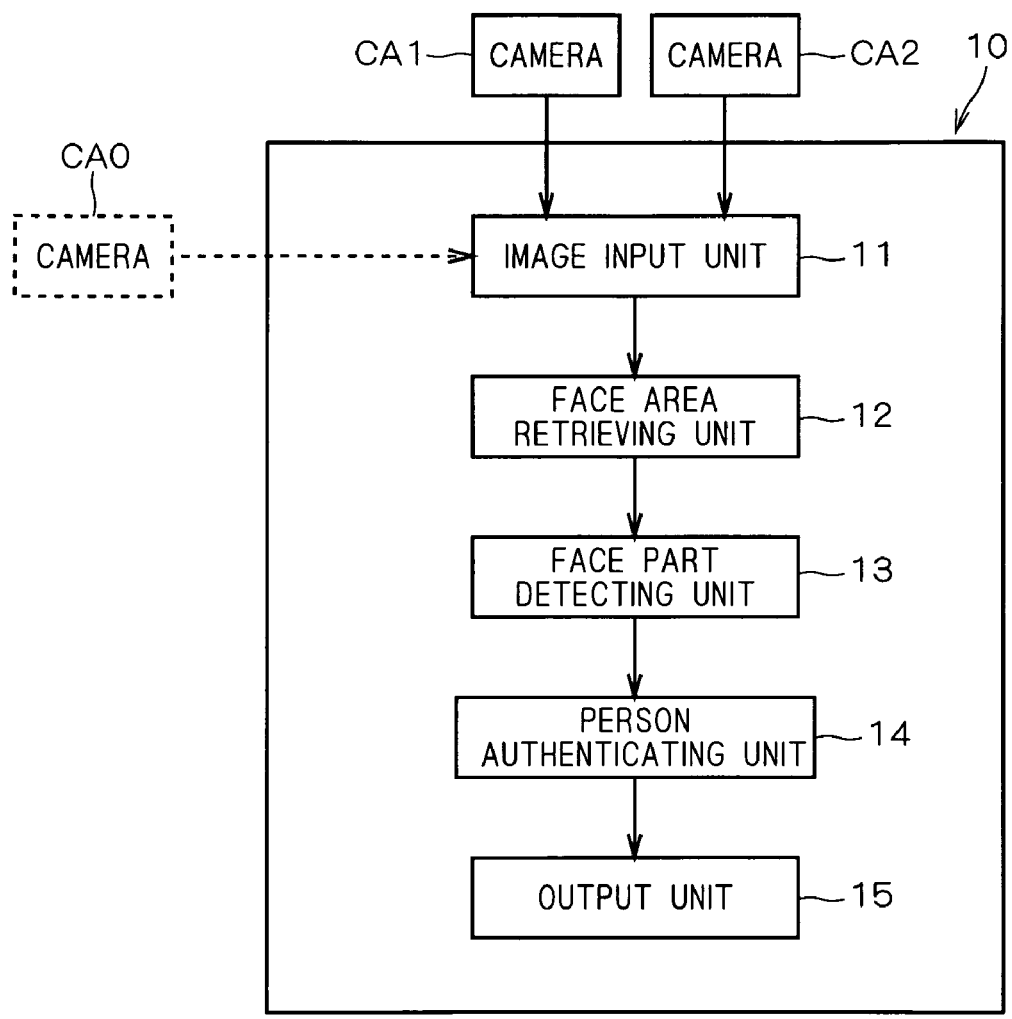
FIG. 4 is a block diagram showing a functional configuration of a controller.

FIG. 1 is a conceptual diagram showing an outline of processes in this embodiment.

In this embodiment, the case of performing modeling using the face of a person as an object and performing face recognizing operation using a three-dimensional model generated by using the model will be described.

The "face authentication" is one of biometrics techniques for automatically identifying a person (person authentication) or the like on the basis of features of a person and is a non-contact authenticating method.

Generally, it is expected to carry out the face authentication technique as follows. A registered image and a captured image of an object to be authenticated are obtained only as plane information ("texture information" or "two-dimensional information"). By simply comparing the plane information of the registered image and that of the captured image with each other, whether a person in the registered image (registered person HMa) and a person in the captured image (person to be authenticated HMb) are the same person or not is determined.

In this embodiment, the case of performing the person authentication using not only "two-dimensional information" but also "three-dimensional information" of the stereoscopic shape (the three-dimensional shape) of the face of a person will be described. The "three-dimensional information" is obtained on the basis of captured images (stereo pair images)

of the registered person HMa and that of the person HMb to be authenticated. By using also the three-dimensional information, the authenticating operation can be performed more accurately. In particular, by performing a comparing operation after the posture of the face is corrected with the three-dimensional information, the authenticating operation can be performed more accurately as compared with the case of comparing two images of the face in different postures (tilts) each other without the correction.

In this embodiment, the case of generating models of persons by using the model fitting method at the time of considering three-dimensional information will be described.

Further, in this embodiment, the case of performing the model fitting on the basis of not the result of measurement of once but results of measurement of a plurality of times will be described. By the model fitting, even if the accuracy of any of the results of measurement of a plurality of times (plural measurement data) is insufficient, the insufficient accuracy can be compensated by the other measurement results. Thus, high-accuracy modeling can be realized stably.

In this embodiment, the case of performing model fitting in consideration of reliability ρ of each piece of measurement data will be described. By the model fitting, modeling of higher-accuracy can be realized.

2. Detailed Configuration

FIG. 2 is a configuration diagram showing a configuration of a face authentication system 1 according to the embodiment of the invention. The face authentication system 1 is also expressed as "a modeling system" since it is a system of modeling a face by using the model fitting method.

As shown in FIG. 2, the face authentication system 1 has a controller 10 and two image capturing cameras (hereinbelow, also called measurement cameras or simply called "cameras") CA1 and CA2. The cameras CA1 and CA2 are disposed so as to be able to capture images of the face of a person HMb to be authenticated from different positions. When face images of the person HMb to be authenticated are captured by the cameras CA1 and CA2, appearance information, specifically, two face images G1 and G2 of the person HMb to be authenticated captured by the image capturing operation is transmitted to the controller 10 via a communication line. The communication system for image data between the cameras and the controller 10 is not limited to a wired system but may be a wireless system.

FIG. 3 is a diagram showing a schematic configuration of the controller 10. As shown in FIG. 3, the controller 10 is a general computer such as a personal computer including a CPU 2, a storage 3, a media drive 4, a display 5 such as a liquid crystal display, an input unit 6 such as a keyboard 6a and a mouse 6b as a pointing device, and a communication unit 7 such as a network card. The storage 3 has a plurality of storage media, concretely, a hard disk drive (HDD) 3a and a RAM (semiconductor memory) 3b capable of performing processes at a higher speed than the HDD 3a. The media drive 4 can read information recorded on a portable recording medium 8 such as CD-ROM, DVD (Digital Versatile Disk), flexible disk, or memory card. The information supplied to the controller 10 is not limited to information supplied via the recording medium 8 but may be information supplied via a network such as LAN and the Internet.

Next, the functions of the controller 10 will be described with reference to FIGS. 4 and 5.

FIG. 4 is a block diagram showing the various function configurations of the controller 10. FIG. 5 is a block diagram showing a detailed functional configuration of a person authenticating unit 14.

The various function configurations of the controller 10 are conceptual functions realized by executing a predetermined computer software program (hereinbelow, also simply called "program") with various kinds of hardware such as the CPU in the controller 10.

As shown in FIG. 4, the controller 10 has an image input unit 11, a face area retrieving unit 12, a face part detecting unit 13, the person authenticating unit 14, and an output unit 15.

The image input unit 11 has the function of inputting two images for authentication captured by the cameras CA1 and CA2 to the controller 10.

The face area retrieving unit 12 has the function of specifying a face part in an input face image.

The face part detecting unit 13 has the function of detecting the positions of feature parts (for example, eyes, eyebrows, nose, mouth, and the like) in the specified face area.

The person authenticating unit 14 is constructed to mainly authenticate a face and has the function of authenticating a person on the basis of a face image. The details of the person authenticating unit 14 will be described later.

The output unit 15 has the function of outputting an authentication result obtained by the personal authenticating unit.

Next, the detailed configuration of the person authenticating unit 14 will be described with reference to FIG. 5.

Figure 5:
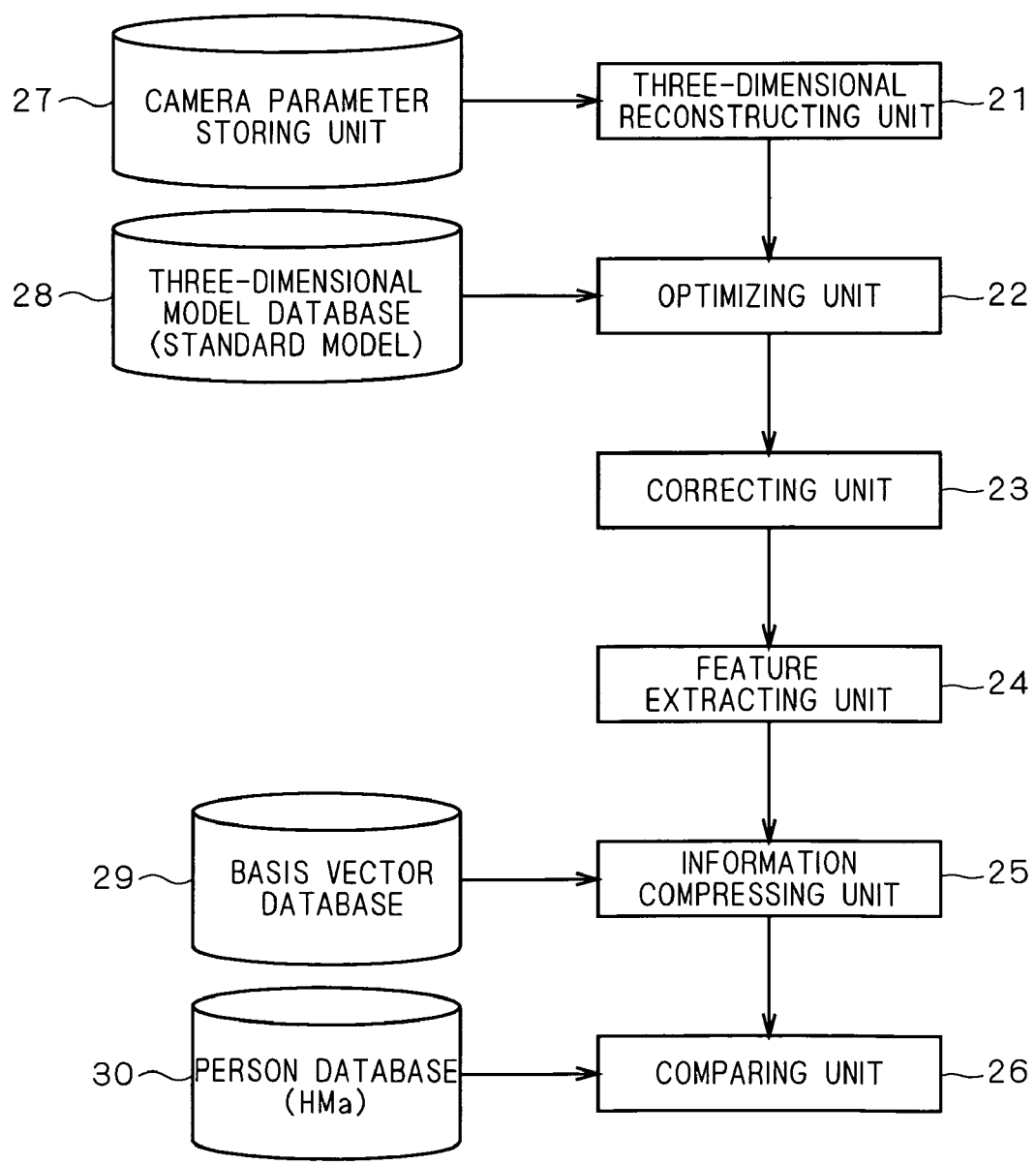
FIG. 5 is a block diagram showing a functional configuration of a personal authenticating unit.

As shown in FIG. 5, the person authenticating unit 14 has a three-dimensional reconstructing unit 21, an optimizing unit 22, a correcting unit 23, a feature extracting unit 24, an information compressing unit 25, and a comparing unit 26.

The three-dimensional reconstructing unit 21 has the function of calculating coordinates in three dimensions of each part from coordinates of a feature part of a face obtained from a plurality of input images. The three-dimensional coordinate calculating function is realized by using camera information stored in a camera parameter storing unit 27.

The optimizing unit 22 has the function of generating an "individual model" of a peculiar person on the basis of calculated three-dimensional coordinates and a standard stereoscopic model (also called "three-dimensional model" or simply called "standard model") of a face stored in a three-dimensional model database 28. The three-dimensional model database 28 is a database configured by the storage 3 and the like.

The correcting unit 23 has the function of correcting (modifying or converting) the generated individual model.

As described above, the processing units 21, 22, and 23 (mainly, the optimizing unit 22) have the model generating function.

By the processing units 21, 22, and 23, information of the person HMb to be authenticated and the registered person HMa is standardized (normalized) and converted into forms which can be easily compared with each other. The individual model generated by the function of the processing units includes both three-dimensional information and two-dimensional information of the face of the person. The "three-dimensional information" is information related to a stereoscopic configuration (a three-dimensional configuration) constructed by three-dimensional coordinate values or the like of representative points. The "two-dimensional information" is information related to a plane configuration constructed by surface information (texture information) and/or information of positions in a plane of the representative points or the like.

The feature extracting unit 24 has a feature extracting function of extracting the three-dimensional information and two-dimensional information from the individual model generated by the processing units 21, 22, and 23.

The information compressing unit 25 has the function of compressing the three-dimensional information and the two-dimensional information used for face authentication by converting each of the three-dimensional information and the two-dimensional information extracted by the feature extracting unit 24 to a proper face feature amount for face authentication. The information compressing function is realized by using information stored in a basis vector database 29, and the like.

The comparing unit 26 has the function of calculating similarity between a face feature amount of the registered person (person to be compared) HMa, which is pre-registered in a person database 30, and a face feature amount of the person HMb to be authenticated, which is obtained by the above-described function units, thereby authenticating the face.

As described above, the function of identifying a person (individual) (person identifying function or individual identifying function) is realized mainly by the processing units 24, 25, and 26, and the processing units 24, 25, and 26 are also generically called individual identifying units.

3. Operations

Outline of the Operations

In the following, the face authenticating operation of the controller 10 will be described more specifically. Concretely, the case of determining whether the person HMb to be authenticated and the registered person HMa are the same person or not by using information of the face images of the person HMb to be authenticated which are captured by the cameras CA1 and CA2 and the face images of the registered person HMa (the case of performing face authentication) will be described. In this case, three-dimensional shape information measured on the basis of the principle of triangulation by using images captured by the cameras CA1 and CA2 is used as the three-dimensional information, and texture (brightness) information is used as the two-dimensional information.

Figure 6:
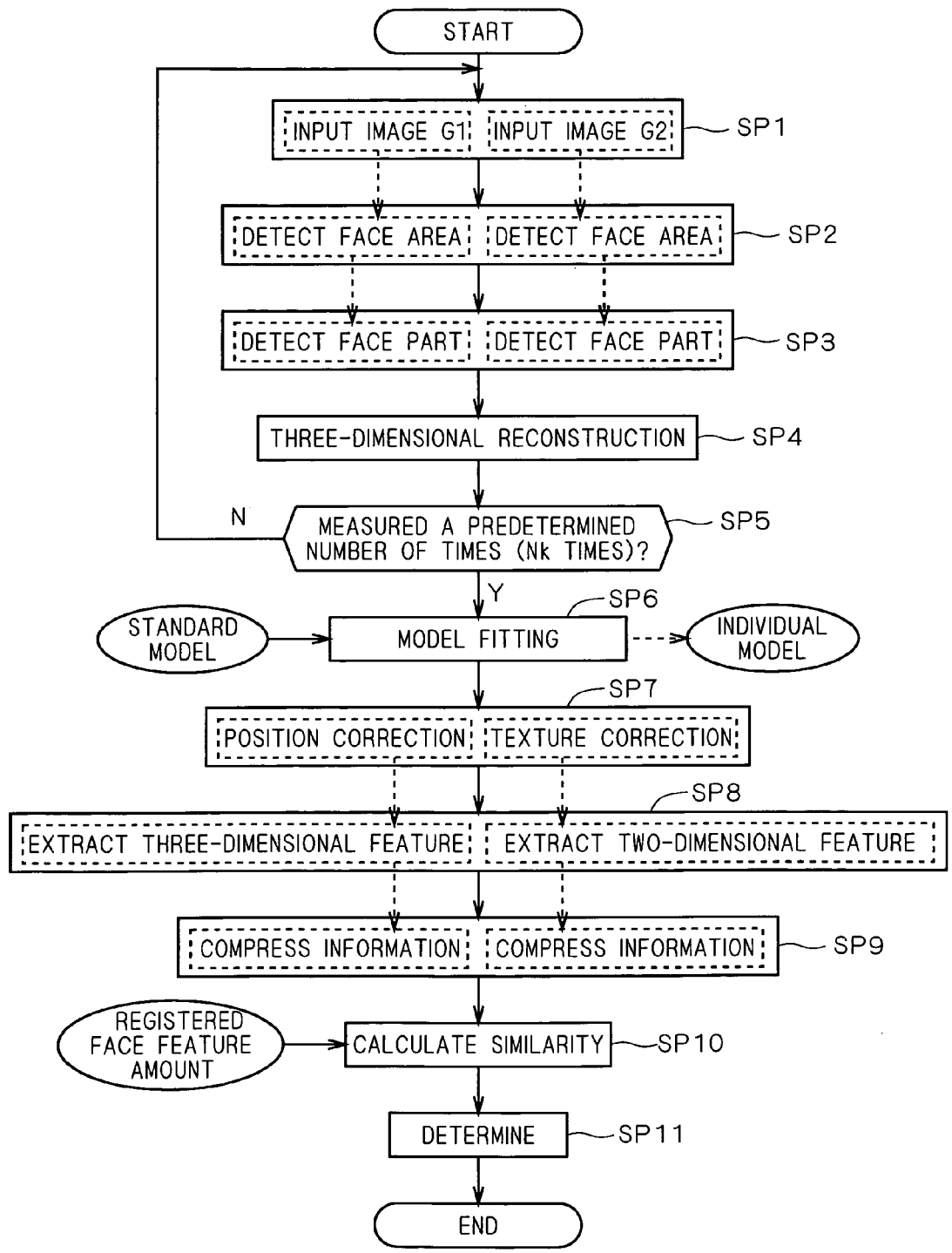
FIG. 6 is a flowchart showing general operation (authenticating operation) of the controller.
Figure 7:
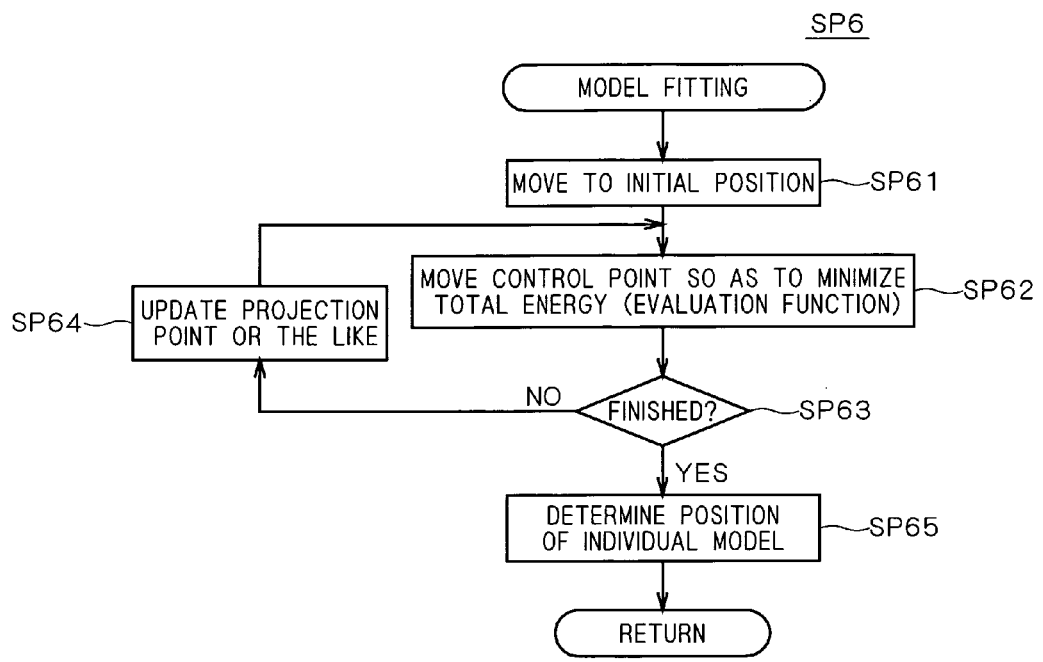
FIG. 7 is a flowchart showing the details of model fitting operation.
Figure 8:
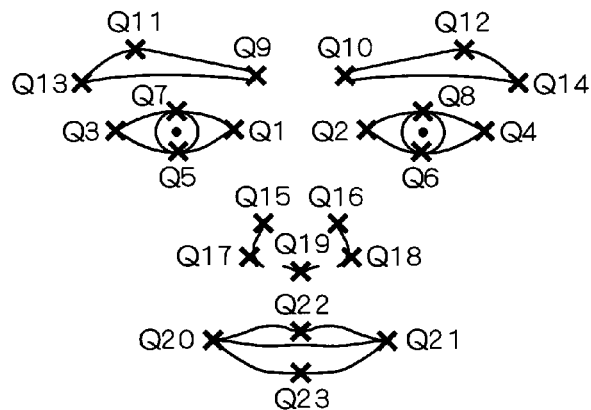
FIG. 8 is a diagram showing feature points of a feature part in a face image.
Figure 9:
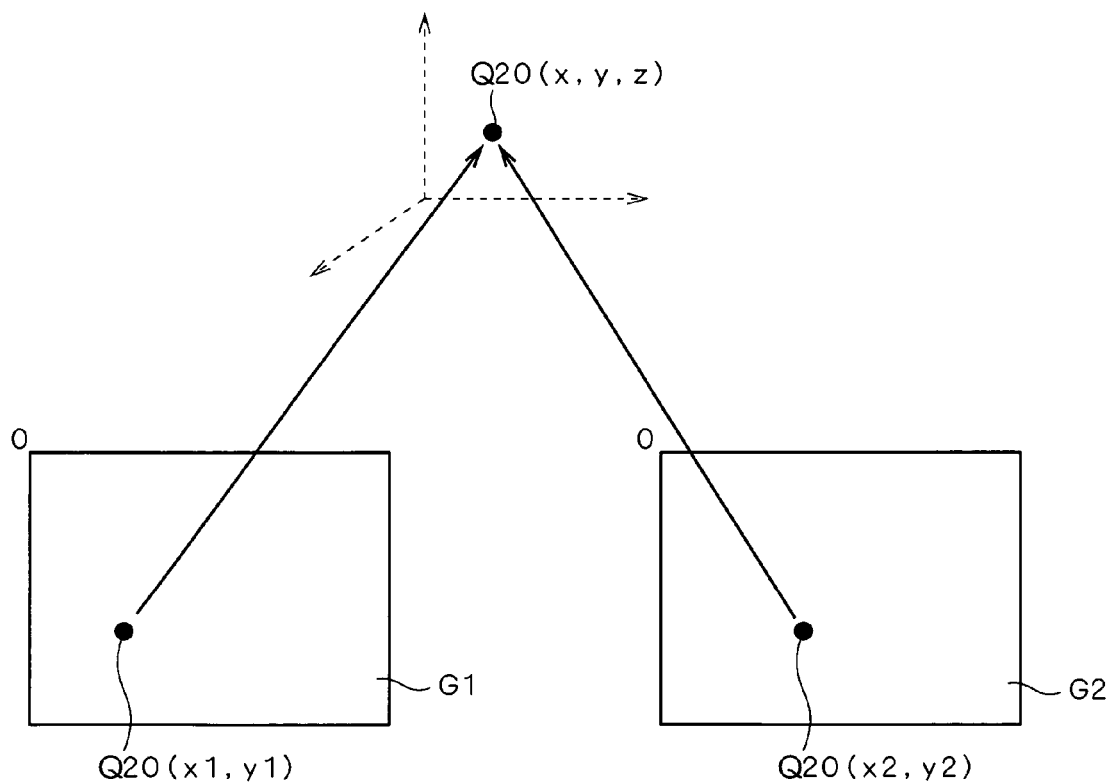
FIG. 9 is a schematic diagram showing a state of calculating three-dimensional coordinates by using the principle of triangulation.

FIG. 6 is a flowchart of the general operation (authenticating operation) of the controller 10. FIG. 7 is a flowchart showing the details of model fitting operation (step SP6). FIG. 8 is a diagram showing representative points of a feature part (hereinbelow, also called "feature points") in a face image. FIG. 9 is a schematic diagram showing a state where three-dimensional coordinates are calculated by using the principle of triangulation from feature points in two-dimensional images. Points Q20 in the images G1 and G2 in FIG. 9 correspond to a point at the right end of a mouth as shown in FIG. 8.

As shown in FIG. 6, the controller 10 obtains a face feature amount of the person to be authenticated on the basis of captured images of the face of the person to be authenticated in the processes from step SP1 to step SP9. After that, by executing the processes in steps SP10 and SP11, face authentication is realized.

The controller 10 performs a measuring operation a plurality of times by repeating the processes from step SP1 to step SP4. By performing the model fitting operation (step SP6) on the basis of a plurality of pieces of measurement data obtained by the measuring operation of the plurality of times, a stereoscopic model of the face of the person to be authenticated is generated. In the processes from step SP7 to step SP11, the face authenticating operation is performed using the generated stereoscopic model.

Measurement: Collection of Information of the Person HMb to be Authenticated (Steps SP1 to SP5)

First, in step SP1, face images of a predetermined person (person to be authenticated) HMb, captured by the cameras CA1 and CA2 are input to the controller 10 via a communication line. Each of the cameras CA1 and CA2 for capturing face images is a general image capturing apparatus capable of capturing a two-dimensional image. A camera parameter Bi ($i=1, \ldots, Nc$) indicating the positional posture of each camera CAi or the like is known and pre-stored in the camera parameter storing unit 27 (FIG. 5). Nc indicates the number of cameras. Although the case where Nc=2 is described in the embodiment, Nc may be three or more (Nc$\geq$3, three or more cameras may be used). The camera parameter Bi will be described later.

In step SP2, an area in which the face exists is detected from each of the two images G1 and G2 input from the cameras CA1 and CA2. As a face area detecting method, for example, a method of detecting a face area from each of the two images G1 and G2 by template matching using a prepared standard face image can be employed.

In step SP3, the position of a feature part in the face is detected from the face area image detected in step SP2. Examples of the feature parts in the face are eyes, eyebrows, nose, and mouth. In step SP3, the coordinates of feature points Q1 to Q23 of the parts as shown in FIG. 8 are calculated. A feature part can be detected by, for example, template matching using a standard template of the feature part. The coordinates of a feature point calculated are expressed as coordinates on the images G1 and G2 input from the cameras. For example, with respect to the feature point Q20 corresponding to the right end of the mouth in FIG. 8, as shown in FIG. 9, coordinate values in the two images G1 and G2 are calculated. Concretely, by using the upper left end point of the image G1 as the origin O, coordinates (x1, y1) on the image G1 of the feature point Q20 are calculated. In the image G2 as well, similarly, coordinates (x2, y2) on the image G2 of the feature point Q20 are calculated.

A brightness value of each of pixels in an area surrounded by feature points (as apex points) in an input image is obtained as information of the area ("texture information"). The texture information in each area is pasted to an individual model in step SP6 or the like which will be described later. In the case of the embodiment, the number of input images is two, so that an average brightness value in corresponding pixels in corresponding areas in the two images is used as the texture information of the area.

In the following step SP4, a three-dimensional reconstructing process is performed. Concretely, three-dimensional coordinates $M^{(j)}$ ($j=1, \ldots, Nj$) of each feature point Qj are calculated on the basis of two-dimensional coordinates $Ui^{(j)}$ in each of images Gi ($i=1, \ldots, Nc$) at the feature points Qj detected in step SP3 and the camera parameters Bi of the camera which has captured the images Gi. In brief, three-dimensional positions of the feature points are calculated on the basis of the principle of triangulation. Nj denotes the number of feature points.

Calculation of the three-dimensional coordinates $M^{(j)}$ will be concretely described hereinbelow.

The relations among the three-dimensional coordinates $M^{(j)}$ at each feature point Qj, the two-dimensional coordinates $Ui^{(j)}$ at each feature point Qj, and the camera parameter Bi are expressed as Equation (1).

$$\mu i U i^{(j)} = B i M^{(j)} \qquad (1)$$

where μi is a parameter indicating a fluctuation amount of a scale. A camera parameter matrix Bi indicates values peculiar to each camera, which are preliminarily obtained by capturing an image of an object whose three-dimensional coordinates are known, and is expressed by a projection matrix of 3×4.

As a concrete example of calculating three-dimensional coordinates by using Equation (1), the case of calculating three-dimensional coordinates $M^{(20)}$ at a feature point Q20 will be considered with reference to FIG. 9. Equation (2) shows the relation between coordinates (x1, y1) at the feature point Q20 on the image G1 and three-dimensional coordinates (x, y, z) when the feature point Q20 is expressed in a three-dimensional space. Similarly, Equation (3) shows the relation between the coordinates (x2, y2) at the feature point Q20 on the image G2 and the three-dimensional coordinates (x, y, z) when the feature point Q20 is expressed in a three-dimensional space.

$$\mu 1 \begin{pmatrix} x1 \\ y1 \\ 1 \end{pmatrix} = B1 \begin{pmatrix} x \\ y \\ z \\ 1 \end{pmatrix} \qquad (2)$$

$$\mu 2 \begin{pmatrix} x2 \\ y2 \\ 1 \end{pmatrix} = B2 \begin{pmatrix} x \\ y \\ z \\ 1 \end{pmatrix} \qquad (3)$$

Unknown letters in Expressions (2) and (3) are five letters in total; two parameters μ1 and μ2 and three component values x, y, and z of three-dimensional coordinates $M^{(20)}$. On the other hand, the number of equalities included in Expressions (2) and (3) is six, so that each of the unknown letters, that is, three-dimensional coordinates (x, y, z) at the feature point Q20 can be calculated. Similarly, three-dimensional coordinates $M^{(j)}$ at all of feature points Qj can be obtained.

In step SP4, further, the relation between a standard model and an object in measurement data is obtained on the basis of three-dimensional coordinates of each of the feature points Qj attained as described above. Concretely, the position, tilt (posture), and scale of an object in measurement data are obtained by using a standard model as a reference.

For example, the position of the object in measurement data in relation to the standard model can be obtained on the basis of a deviation amount between a predetermined reference position of the standard model and a corresponding reference position in the measurement data. The tilt and the scale of the object in the measurement data relative to the standard model can be obtained on the basis of a deviation amount between a reference vector connecting predetermined two points in the standard model and a reference vector connecting points corresponding to the two predetermined points in the measurement data. More specifically, by comparing coordinates of a middle point QM between a feature point Q1 at the inner corner of the right eye and a feature point Q2 at the inner corner of the left eye with coordinates of a point corresponding to the middle point QM in the standard model, the relative position of the object in the measurement data can be obtained. Further, by comparing the middle point QM with other feature points, the scale and tilt in the measurement data can be calculated. The values are used for the model fitting process which will be described later.

Equation (4) indicates a transformation parameter (vector) vt expressing the relation between the standard model and the object in the measurement data. As shown in Equation (4), the transformation parameter (vector) vt is a vector having, as its elements, scale transformation indices sz of the standard model and the object, transformation parameters (tx, ty, tz) indicating translation displacements in three orthogonal axes, and translation parameters (φ, θ, ψ) indicating a rotation displacement (tilt). T at the right shoulder indicates transposition (hereinbelow, the definition will be the same).

$$vt = (sz, \phi, \theta, \psi, tx, ty, tz)^T \qquad (4)$$

(wherein T expresses transposition. The definition will be the same in the following.)

The measuring operation is performed once as described above.

After that, similar operations (steps SP1 to SP4) are repeated a plurality of times (Nk times). More specifically, for example, by capturing images of an object person to be recognized who is approaching the cameras CA1 and CA2 in predetermined time intervals a plurality of times, a plurality of pieces of measurement data (hereinbelow, also simply called "measurement data of a plurality of times") are obtained by measurement of a plurality of times at time points different from each other, and the operations in steps SP2 to SP4 are performed on images (stereo pair images) captured at the time points.

After confirming that the operations in steps SP1 to SP4 are repeated predetermined times (Nk times) (step SP5), the program advances to the following step SP6.

Model Fitting (step SP6)

In the following step SP6, model fitting is performed. The "model fitting" is a process of generating an "individual model" in which input information of the face of a person to be authenticated is reflected by modifying a "standard model (of a face)" as a prepared model of a general (standard) face by using the information of the person to be authenticated. Concretely, a process of changing three-dimensional information of the standard model by using the calculated three-dimensional coordinates $M^{(j)}$ is performed. In addition, in the embodiment, a process of changing two-dimensional information of the standard model by using the texture information of an image is also performed.

Figure 10:
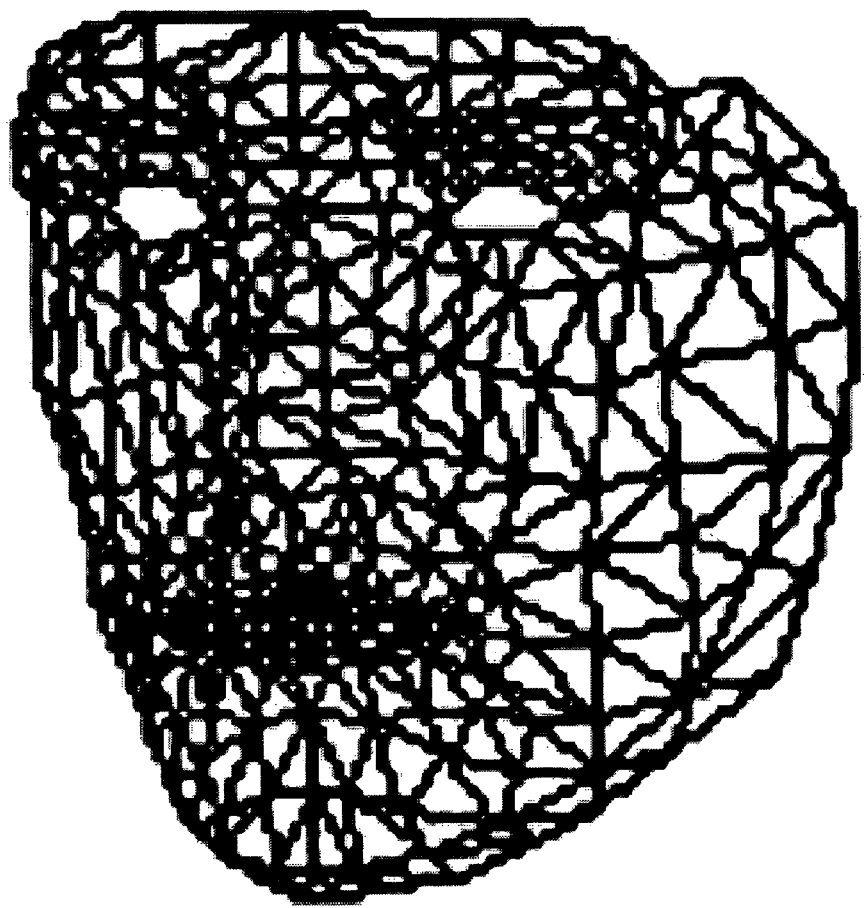
FIG. 10 is a diagram showing a standard model of a three-dimensional face.

FIG. 10 is a diagram showing an example of a standard model of a three-dimensional face.

As shown in FIG. 10, the standard model of a face is constructed by vertex data and polygon data. The vertex data is a collection of coordinates of a vertex (hereinbelow, also called "standard control point") COj of a feature part in the standard model, each standard control point Coj corresponding to the three-dimensional coordinates at each feature point Qj calculated in step SP4 in a one-to-one correspondence manner. The polygon data is obtained by dividing the surface of the standard model into small polygons (for example, triangles) and expressing the polygons as numerical value data. FIG. 10 shows the case where the vertex of a polygon is constructed also by an intermediate point other than the standard control point COj. The coordinates at an intermediate point can be obtained by a proper interpolating method using coordinate values of the standard control point COj.

The model fitting process (step SP6) for obtaining an individual model on the basis of a standard model will now be described specifically with reference mainly to the flowchart of FIG. 7.

Figure 11:
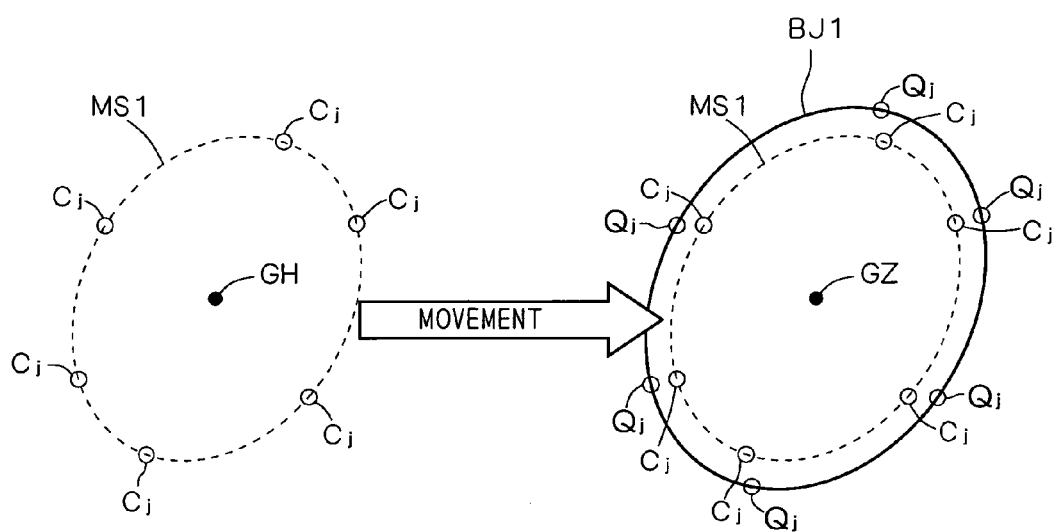
FIG. 11 is a conceptual diagram showing a state of moving a standard model to an initial position.

First, the vertex (standard control point COj) of each of feature parts of the standard model is moved to an initial position in the model fitting process. FIG. 11 is a diagram conceptually showing a state of moving a standard model MS1 to the initial position. In FIG. 11, for convenience of the drawing, a face region BJ1 in measurement data and the standard model MS1 corresponding to the face region BJ1 are properly constructed simply (or abstractly).

Concretely, as shown in FIG. 11, the standard model MS1 is moved so that center GH of gravity of three-dimensional coordinate values of all (or part) of standard control points COj and center GZ of gravity of three-dimensional coordinate values of corresponding feature points Qj are adjusted, and each of the standard control points COj is moved to the initial position in the model fitting process. Consequently, the operation of modifying the standard model can be started from a relatively accurate position. Preferably, an initial posture is also adjusted relatively accurately by, for example, disposing the standard model so as to be adjusted to a posture calculated by all or part of the feature points Qj. Similarly, it is also preferable to determine an initial scale of the standard model so as to be temporarily adjusted to the scale of measurement data. The initial position, the initial posture, and the initial scale in the model fitting process can be determined on the basis of an average value of parameters vt of Equation (4) of a plurality of measurement times.

In the following, the standard control point COj having an initial coordinate value in a state where it is registered in the database 28 and a standard control point after movement will be generically called standard control points (or simply control points) Cj.

Next, in step SP62, total energy E (which will be described later) is used as an evaluation function, and each of the control points Cj is moved so as to minimize the total energy E, thereby deforming the standard model MS1.

As will be described later, the total energy E includes external energy Fe and internal energy Ge, and each of the external energy Fe and the internal energy Ge is a function of a coordinate value of each of the control points Cj of the standard model. Consequently, the total energy E is a function of a coordinate value of each of the control points Cj of the standard model. For example, when the number of control points is 20, three coordinates (x, y, z) exist for each control point, so that the total energy E is a function for variables of 60 dimensions (=20×3).

When partial differential equations in which equations obtained by partially differentiating the total energy E with the variables are set equal to 0 are assumed, 60 partial differential equations for the variables are satisfied. By solving the partial differential equations, values of the variables (that is, coordinate values) that minimize the total energy E are obtained. The optimizing unit 22 moves the control points Cj to the coordinate values obtained as described above. In such a manner, by moving the control points Cj so as to minimize the total energy E, the standard model MS1 is deformed.

As a result, while avoiding excessive deformation, the standard model is deformed so that measurement data is reflected. For example, in the case of minimizing the energy in consideration of only the external energy Fe without considering the internal energy Ge, the model is deformed so that each of the control points Cj moves so as to approach a corresponding point. In the case of minimizing the energy in consideration of the internal energy Ge, deformation is performed so as to maintain the initial shape of the model and, as a result, a control point may be moved in a direction different from the direction of approaching the corresponding point.

The total energy E will now be described.

As shown by Equation (5), the total energy E is expressed by the sum of the external energy Fe related to a deviation (difference) between a standard model and measurement data and the internal energy Ge for avoiding excessive deformation.

$$E = Fe + Ge \quad (5)$$

Figure 12:
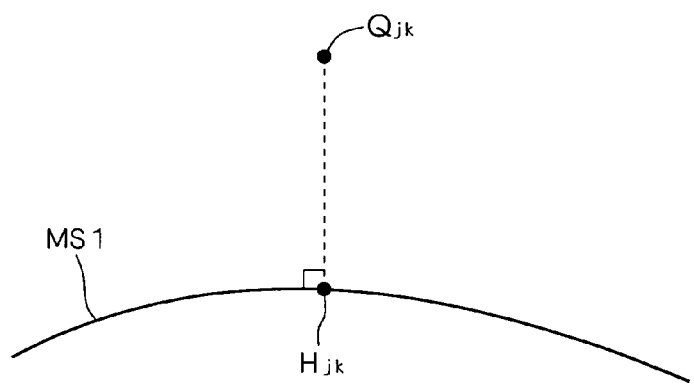
FIG. 12 is a diagram showing the relation between a feature point and a projection point.

The external energy Fe is an evaluation element (term) on a plurality of pieces of measurement data. The external energy Fe is expressed as shown by Equation (6) using a distance |Hjk−Qjk| between the j-th feature point Qj in the k-th measurement data (hereinbelow, also called Qjk) and a projection point Hjk existing in a position shortest from the feature point Qjk to the surface of the standard model MS1 (refer to FIG. 12). To simplify the signs, a vector indicating the three-dimensional coordinates $M^{(j,k)}$ of the feature point Qjk is also expressed as "Qjk", and a vector indicating the three-dimensional coordinates of the projection point Hjk is also expressed as "Hjk".

$$Fe = \frac{\alpha}{N_k} \sum_{k=1}^{N_k} \frac{1}{N_j} \sum_{j=1}^{N_j} (W_{jk} \times |H_{jk} - Q_{jk}|) \quad (6)$$

Herein, α denotes a constant, Nk denotes the number of measurement times, and Nj indicates the number of control points.

Wjk is a function of reliability ρ (specifically, ρjk) and is expressed by, for example, a linear function of the reliability ρ or the like. The reliability (or the degree of reliability) ρ is an index value indicating the degree of reliability of measurement data and, as a rule, is set for each measurement point in each measurement time. The reliability ρ of the j-th measurement point in the k-th measurement time (feature point Qjk) is expressed as ρjk. The reliability ρ will be described later.

The vector Hjk (strictly, each element in the vector Hjk) is expressed as functions of coordinate values of three points Cj (j=Cb1, Cb2, Cb3 which express three points in the vicinity) in the standard model, so that the external energy Fe is expressed as a function of a coordinate value of each control point Cj.

The external energy Fe is also expressed as an energy term including an element reflecting the relation between each measurement position ($M^{(j,k)}$=vector Qjk) of each measurement time related to each of the feature points in the face and the standard model or an energy term including an element reflecting the distance between the feature point Qjk and the outline of the standard model. By minimizing the external energy Fe, the action of making the shape of the standard model similar to the outline in the measurement data acts.

Figure 13:
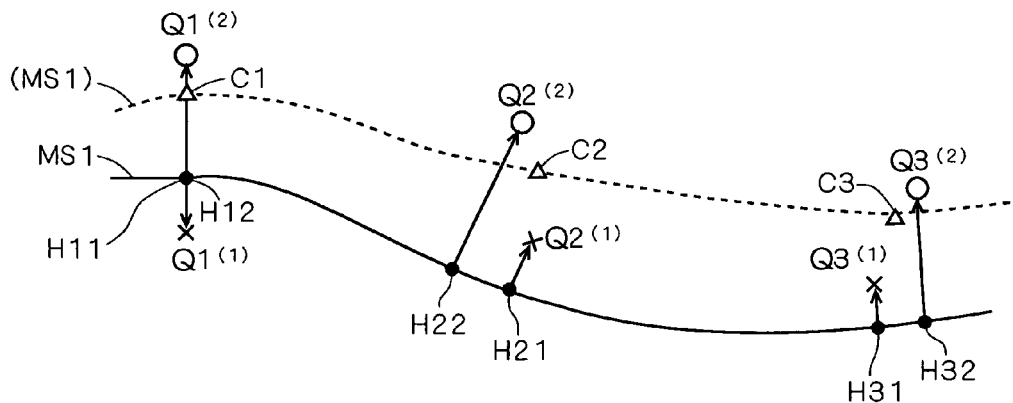
FIG. 13 is a conceptual diagram showing the action of external energy.

FIG. 13 is a conceptual diagram showing such an action accompanying minimization of the external energy Fe. In FIG. 13, the sign "×" indicates the feature points (measurement points) $Q1^{(1)}, Q2^{(1)}, Q3^{(1)}, \ldots$ in the measurement of the first time, and the sign "○" (circle) indicates the feature points (measurement points) $Q1^{(2)}, Q2^{(2)}, Q3^{(2)}, \ldots$ in the measurement of the second time. The solid line indicates the outline of the standard model before deformation, and the broken line indicates the outline of the standard model after deformation. The feature point Qjk is also expressed as $Qj^{(k)}$.

As shown in Equation (6), the external energy Fe has a term related to the distance |Hjk−Qjk| between the feature point Qjk in each of the measurement data in the plurality of times and the outline of the standard model. Consequently, as shown in FIG. 13, at the time of minimizing the external energy Fe, the force of deforming the outline of each standard model acts so that each Hjk moves in the direction of a vector (the arrow in the diagram) toward the corresponding feature point Qjk.

In this case, also by using only data of measurement of a single time (for example, measurement of the first time), the outline of the standard model can be deformed so as to be brought close to the feature points Qjk. However, in the case where only measurement data obtained by measurement of once per measurement point exists and the accuracy of the measurement data is low, it cannot be always said that the accuracy of the model deformation itself is sufficient.

In contrast, by using measurement data in measurement of a plurality of times like in the embodiment, the outline of a standard model can be deformed more accurately. In particular, even if the accuracy of any piece of the measurement data of a plurality of times is insufficient, the insufficient accuracy can be compensated by the other measurement data, so that high-accuracy modeling can be performed stably. That is, modeling accuracy can be improved.

In particular, in the case where an object is a moving body or the like, when measurement data of a plurality of times is obtained while changing the relation (such as positional relation) between the image capturing cameras CA1 and CA2 and the object, various measurement data in various situations can be obtained as the relation changes, so that the modeling accuracy can be improved. Similarly, when measurement data of a plurality of times is obtained while changing the relative positions of a light source and an object and/or when measurement data of a plurality of times is obtained while changing the relation between the light source and the image capturing cameras, various measurement data in various circumstances can be obtained with fluctuations in the relation. Thus, modeling accuracy can be improved. As described above, it is preferable to perform measurement of a plurality of times under different conditions. For example, even in the case where a pixel corresponding to a feature point is dropped in a measurement time, the pixel value of the pixel may be properly obtained without dropping the pixel corresponding to the feature point in a measurement time after the circumstances are changed (for example, after the relative positions of the light source and the object change).

In calculation of the external energy Fe in Equation (6), the each of the distances |Hjk−Qjk| is multiplied with the weight factor Wjk according to the reliability ρ of measurement data of each of a plurality of times, and the resultant distances are added. That is, the distances |Hjk−Qjk| are weighted and added in accordance with reliability of each piece of the measurement data. In other words, the external energy Fe is corrected by using the weight factor (Wjk) according to the reliability ρ (specifically, ρk or ρjk which will be described later) of each piece of the measurement data, and the value of the total energy E is obtained. In this manner, in consideration of the reliability of each piece of measurement data, the modeling accuracy can be further improved.

Figure 14:
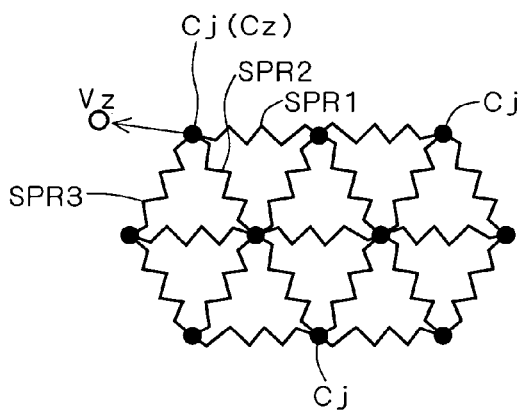
FIG. 14 is a conceptual diagram showing the action of internal energy.

As shown in FIG. 14, the internal energy Ge is expressed, for example, as shown by Equation (7), when it is assumed that the control points Cj are connected to each other via virtual springs SPR (SPR1, SPR2, SPR3, . . . ). FIG. 14 is a schematic diagram showing a state where the control points are connected via virtual springs.

$$Ge = \frac{\beta}{N_m} \times \sum_{m=1}^{N_m} \left( \frac{K_m \times V_m}{L_m} \right)^2 \quad (7)$$

Herein, β denotes a constant, Nm denotes the number of virtual springs, Km denotes spring modulus of the m-th virtual spring, Lm denotes a natural length of the m-th virtual spring, and Vm indicates a displacement amount from the natural length of the m-th virtual spring.

In this case, Vm is expressed as a function of each of the control points Cj, so that the internal energy Ge is expressed as a function of a coordinate value of the control point Cj.

In Equation (7), excessive movement of each of the control points Cj is expressed as increase in energy accumulated in the virtual spring SPR. For example, when a control point Cz moves to a point Vz and a relative displacement with respect to the other control points increases, energy generated by elongation of the virtual springs SPR1, SPR2, and SPR3 is accumulated in the virtual springs SPR1, SPR2, and SPR3, and the internal energy Ge increases. As described above, the internal energy Ge of the standard model which is excessively deformed increases. On the other hand, as the standard model becomes closer to the standard state, the internal energy Ge decreases.

The internal energy Ge is also expressed as an energy term which is optimized when the relation of the control points Cj of the standard model becomes closer to a predetermined relation (that is, a state where all of virtual springs have natural length). In brief, as will be described later, by minimizing the internal energy Ge, the action of maintaining the standard model in a predetermined shape, that is, the action of avoiding excessive deformation can be obtained.

FIG. 7 will be referred to again.

After the process of step SP62 is finished, in the following step SP63, whether the model fitting process is finished or not is determined. Whether a change amount between the total energy E of a reference model before deformation (in the case where deformation occurs a plurality of times, a standard model subjected to the immediately preceding deformation) and the energy E of the deformed standard model is a predetermined amount or less is used as a reference of the end determination. In this case, when the total energy E does not change so much in spite of movement of a control point, the process can be finished.

In the case where it is determined in step SP63 that the model fitting process is not yet finished, the program advances to step SP64.

In step SP64, a projection point Hjk is updated. Concretely, the point on the moved standard model closest to the feature model Qjk is re-detected as a new projection point Hjk. After that, returning again to step SP62, the above-described operations (steps SP62 and SP63) are repeated.

In the "projection point updating operation" in step SP64, by finely adjusting the position of the projection point also in the case where the position of the projection point changes as the standard model is deformed, the model fitting can be performed more accurately.

On the other hand, in the case where it is determined in step SP63 that the model fitting process is finished, the finally obtained deformed model is determined as an "individual model" corresponding to the face of the person to be authenticated (step SP65). A standard control point in an individual model will be called an "individual control point". The coordinates of an intermediate point other than the individual control point Cj in an individual model can be obtained by a proper interpolating method using the coordinate values of the individual control point Cj.

In step SP65, a process of newly obtaining the transformation parameter vt (Equation (4)) expressing the relation between the standard model and the individual model is also performed on the basis of the positional relation between a standard model in a registered state (before initial movement) and the deformed standard model (determined individual model). The transformation parameter vt is used in step SP7 (which will be described later).

In step SP65, a process of changing the two-dimensional information of the standard model by using texture information is also performed. Concretely, the texture information of regions in the input images G1 and G2 is pasted (mapped) to corresponding regions (polygons) on the three-dimensional individual model. Each region (polygon) to which the texture information is pasted on a stereoscopic model (such as individual model) is also called a "patch".

As described above, the process in step SP6 (the model fitting process) is performed, and a stereoscopic model of the "face" of the person HMb to be authenticated is generated. Information of the person HMb to be authenticated is generated as an "individual model" including both three-dimensional information and two-dimensional information of the person HMb to be authenticated.

Reliability

The reliability $\rho$ will now be described.

As described above, the reliability $\rho$ is an index value indicating the degree of reliability of each piece of measurement data. Examples of elements used for obtaining the reliability $\rho$ are:

(1) accuracy of correspondence in stereo pair images,
(2) distance to an object to be measured,
(3) the posture of an object to the measured,
(4) the degree of change with time,
(5) contrast of a feature point, and
(6) the direction of a normal vector to a plane near the feature point.

In the following, the case of employing any one of the elements as the reliability $\rho$ will be described. However, the invention is not limited to the case. A value calculated by combining the elements can be also used as the reliability $\rho$.

(1) In the Case of Using "Accuracy of Correspondence in a Stereo Image"

Figure 15:
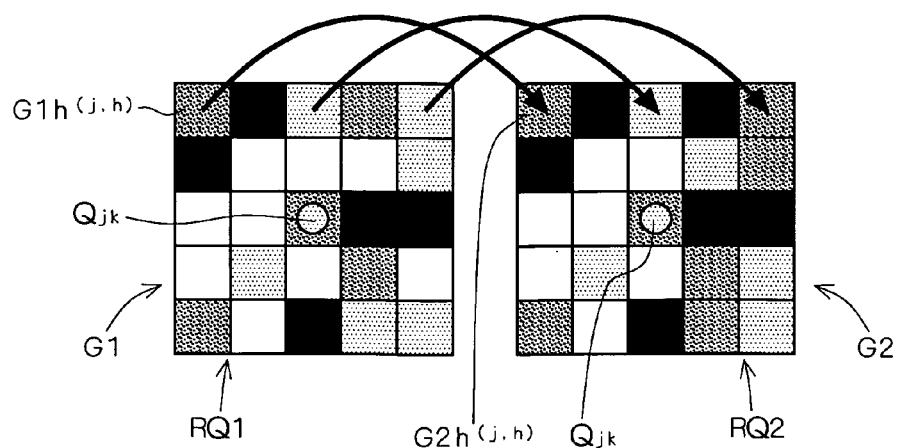
FIG. 15 is a diagram showing the relation between corresponding regions in stereo pair images.

Reliability $\rho jk$ of the j-th measurement point (feature point) Qjk in the k-th measurement is obtained, for example, as a value Rjk in Equation (8). The value Rjk is calculated on the basis of the difference between corresponding pixels in a region RQ1 around the feature point Qjk in the image G1 and a region RQ2 around the feature point Qjk in the image G2 (refer to FIG. 15). Specifically, the value Rjk is a correlation value between the corresponding regions RQ1 and RQ2 in the images G1 and G2 related to the feature point Qjk. FIG. 15 is a diagram showing the relation between the corresponding regions (RQ1 and RQ2) in the stereo pair images G1 and G2.

$$\rho_{jk} = R_{jk} = \frac{D0}{\sum_{\gamma=1}^{N_\gamma} |G1\gamma^{(j,k)} - G2\gamma^{(j,k)}|/N_\gamma} \tag{8}$$

A value D0 denotes a constant, $G1\gamma^{(j,k)}$ denotes a pixel value (tone value) of the γ-th pixel in the near field region RQ1, $G2\gamma^{(j,k)}$ denotes a pixel value (tone value) of the γ-th pixel in the near field region RQ2, and Nγ denotes the number of pixels in each of the near field regions RQ1 and RQ2. The subscript (j,k) at the right shoulder indicates an amount related to the j-th measurement point in the k-th measurement.

The denominator of Equation (8) is a value obtained by adding differential absolute values of pixel values between all of pixels in the near field region RQ1 using a feature point Qjk in the image G1 as a center (for example, a region constructed by 5×5=25 pixels around the feature point Qjk as a center) and corresponding pixels in the near field region RQ2 using the corresponding feature point Qjk as a center in the image G2. In the case where correspondence between the stereo pair images G1 and G2 is accurate, the difference in pixel values of corresponding pixels in the images is small, so that the denominator is a small value, and the value Rjk is a large value. That is, in the case where correspondence is accurate, the reliability $\rho jk$ is a relatively large value.

As described above, the reliability $\rho jk$ of data on the j-th measurement point Qjk in the k-th measurement can be expressed by using the value Rjk indicating accuracy of correspondence in stereo pair images.

Although the case of individually obtaining the reliability $\rho jk$ every measurement time related to the measurement position of each feature point has been described above, the invention is not limited to the case. It is also possible to obtain the reliability $\rho k$ of each measurement time of measurement data on assumption that the reliability in measurement times of measurement data is the same at any of the measurement points (feature points). That is, on assumption that the reliability $\rho jk$ of data at the measurement points Qjk in the k-th measurement is the same, the reliability $\rho k(=\rho jk)$ in the k-th measurement may be obtained.

For example, the reliability $\rho jk$ obtained by using Equation (8) on a specific feature point Qj of each measurement time may be obtained as the reliability $\rho k$.

The elements (2) to (6) are similar to the element (1). In the following, the cases of obtaining the reliability $\rho k$ of each measurement time will be described with respect to each of the elements (2) to (6).

(2) In the Case of Using "Distance to an Object to be Measured"

For example, as shown in Equation (9), a value which is inversely proportional to an average value Lk (refer to Equation (10)) of distances Ljk to measurement points Qjk in the k-th measurement (average distance to an object to be measured can be used as the reliability $\rho jk=\rho k$.

$$\rho_{jk} = \rho_k = \frac{D1}{L_k} \tag{9}$$

$$L_k = \sum_{j=1}^{N_j} L_{kj} \tag{10}$$

In Equation (9), as the distance Lk decreases, the reliability $\rho k$ increases. More specifically, when the distance Lk from a camera to an object to be measured is relatively long, the reliability of a measurement value is relatively low. On the other hand, when the distance Lk is relatively short, the reliability of a measurement value is relatively high. The value D1 denotes a constant. As the value D1, for example, a reference (standard) distance to an object to be measured can be used.

(3) In the Case of Using "the Posture of an Object to the Measured"

For example, as shown in Equation (11), a value related to a deviation angle θk (refer to FIG. 16) from a reference posture PS (for example, front facing posture) of the posture of an object (HMb) to be measured in the k-th measurement can be used as the reliability ρjk=ρk. FIG. 16 is a top view of a face.

$$\rho_{jk}=\rho_k=D2\times\cos\theta_k \qquad (11)$$

In Equation (11), as the amount of deviation from the front-facing posture (reference posture) of the face (the object to be measured) decreases, the reliability ρk increases. More specifically, when the angle θk of deviation from the front-facing posture of the face is relatively large, the reliability of a measurement value is relatively low. On the other hand, when the angle θk of deviation is relatively small, the reliability of a measurement value is relatively high. The value D2 denotes a constant.

(4) In the Case of Using "the Degree of Change with Time"

For example, as shown in Equation (12), a value using a deviation amount $|Q_j^{(k)}-Q_j^{(k-1)}|$ between a measurement point Qjk (also expressed as $Q_j^{(k)}$) in the k-th measurement and a measurement point $Q_j^{(k-1)}$ in the (k−1)th measurement immediately preceding the k-th measurement (that is, a change in position with time ("the degree of change with time") at each measurement point (feature point)) can be used as the reliability ρjk=ρk. In the denominator of Equation (12), an average value of the degree of change with time in all of Nj measurement points is calculated. The values D3, D4, ad D5 are constants.

$$\rho_{jk} = \rho_k = \frac{D4}{\left(1+\frac{D3}{N_j}\sum_{j=1}^{N_j}|Q_j^{(k)}-Q_j^{(k-1)}|\right)^{D5}} \qquad (12)$$

In Equation (12), when a change in position with time at each feature point is relatively large (for example, when a change in facial expression is large at the time of smiling or the like), the reliability of a measurement value is relatively low. On the contrary, when the degree of change with time is relatively small and facial expression of emotions does not appear, the reliability is relatively high. As described above, the smaller a change in position with time at each feature point is, the higher the reliability ρk is.

(5) In the Case of Using "Contrast of a Feature Point"

In the case of performing three-dimensional measurement using stereo pair images, the higher the contrast at corresponding feature points and/or around is, the more the measurement accuracy improves. For example, when pixels at feature points Qi and in the neighborhood are expressed as shown in FIGS. 17 and 18, a value obtained by adding the absolute values of the differences of the pixel values is expressed as Equation (13) as reliability related to contrast.

$$\rho_{jk} = \rho_k = \sum_p \sum_q |S(x+p,q)-S(x+p+1,q)| \qquad (13)$$

$$(p=-2,\ldots,+1; q=-2,\ldots,+2)$$

In Equation (13), the higher the contrast at a feature point is, the higher the reliability ρi is.

(6) In the Case of Using "the Direction of a Normal Vector to a Plane Near a Feature Point"

For evaluating reliability of a feature point, the direction of a plane in the vicinity of the feature point can be employed. Specifically, when the plane is perpendicular to the camera, an image is captured from the front, and it can be said that the reliability is high.

Figure 19:
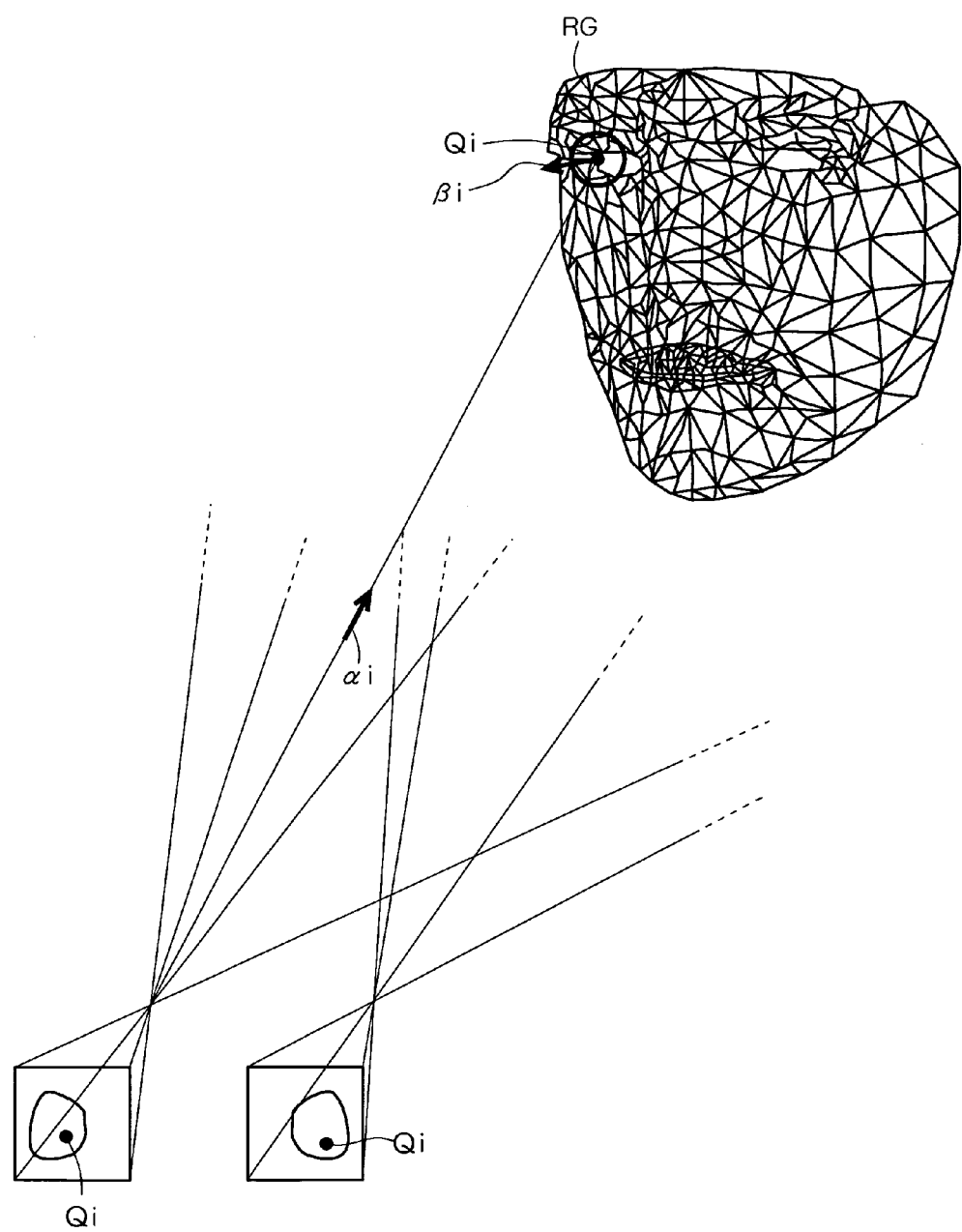
FIG. 19 is a diagram showing a visual line vector and a mean normal vector.

For example, as shown Equation (14), the inner product of two vectors αi, βi (which are shown in FIG. 19) can be calculated as the reliability of a feature point Qi. A vector αi is a visual line vector (unit vector) from the camera to a feature point Qi and a vector βi is an average normal vector (unit vector) of planes in the vicinity of the feature point Qi (in other words, an average normal vector of patches in the region RG near the feature point Qi). An average normal vector βi can be also expressed as an average vector of normal vectors of planes in the vicinity of the feature point Qi, or as a normal vector of a representative plane (average plane) in the vicinity of the feature point Qi. An angle $\Theta_i$ is an angle between a vector αi and a vector βi.

$$\rho_{jk}=\rho_k=|\alpha_i\cdot\beta_i|=|\cos\Theta_i| \qquad (14)$$

In Equation (14), the smaller the angle formed between the visual line vector and the average normal vector is smaller and the larger the inner product is, that is, the more the plane of the region in the vicinity of the feature point is perpendicular to the camera is, ρi increases, and it can be expressed that reliability is high.

In Equation (6), Wjk is determined by using the reliability ρjk of each measurement data (for example, Wjk=ρjk), and the distances |Hjk−Qjk| are weighted and added using Wjk, thereby determining the external energy Fe. Therefore, by adding elements related to measurement points with weighting according to reliability of data, the external energy Fe can be calculated. Thus, more accurate model fitting can be performed.

Process for Correcting Individual Model (step SP7)

FIG. 6 will be referred to again.

In the following step SP7, the individual model is corrected on the basis of the standard model as a reference. In the process, a position (alignment) correction on three-dimensional information and a texture correction on two-dimensional information are executed.

The alignment (face orientation) correction is a process of correcting position, posture, or the like in three-dimensional information. The alignment correction is performed on the basis of the scale, tilt, and position of an individual model when the standard model is used as a reference. More specifically, by converting coordinates of an individual model by using the transformation parameter vt (which is calculated in step SP65 (refer to Equation (4)) indicating the relation between the standard model as a reference and the individual model, a three-dimensional face model having the same posture as that of the standard model can be created. That is, by the alignment correction, the three-dimensional information of the person to be authenticated can be properly normalized.

The texture correction is a process of correcting texture information mapped to the individual model subjected to the alignment correction. As the texture correction, light source correction can be performed by a proper method. For example, the pixel value of each of pixels in a patch can be corrected on the basis of the relation between a light source and each of patches at the time of capturing an image.

Feature Extracting Process and the Like (steps SP8 and SP9)

In the following step SP8 (FIG. 6), as information indicating features of the person HMb to be authenticated, three-dimensional shape information (three-dimensional information) and texture information (two-dimensional information) is extracted.

As the three-dimensional information, a three-dimensional coordinate vector of Nj pieces of individual control points Cj in the individual model is extracted. Concretely, as shown in Equation (15), a vector $h^S$ having, three-dimensional coordinates (Xj, Yj, Zj) of the Nj pieces of individual control points Cj (j=1, ..., Nj) is extracted as the three-dimensional information (three-dimensional shape information).

$$h^s = (X1, \ldots, X_{Nj}, Y1, \ldots Y_{Nj}, \ldots, Z1, \ldots, Z_{Nj})^T \quad (15)$$

As the two-dimensional information, texture (brightness) information (hereinbelow, also called "local two-dimensional information") of a feature part in a face, that is important information for person authentication, that is, patches around an individual control point or a group (local area) of patches is extracted. In this case, as texture information (local two-dimensional information), information mapped to the individual model is used.

Figure 20A:
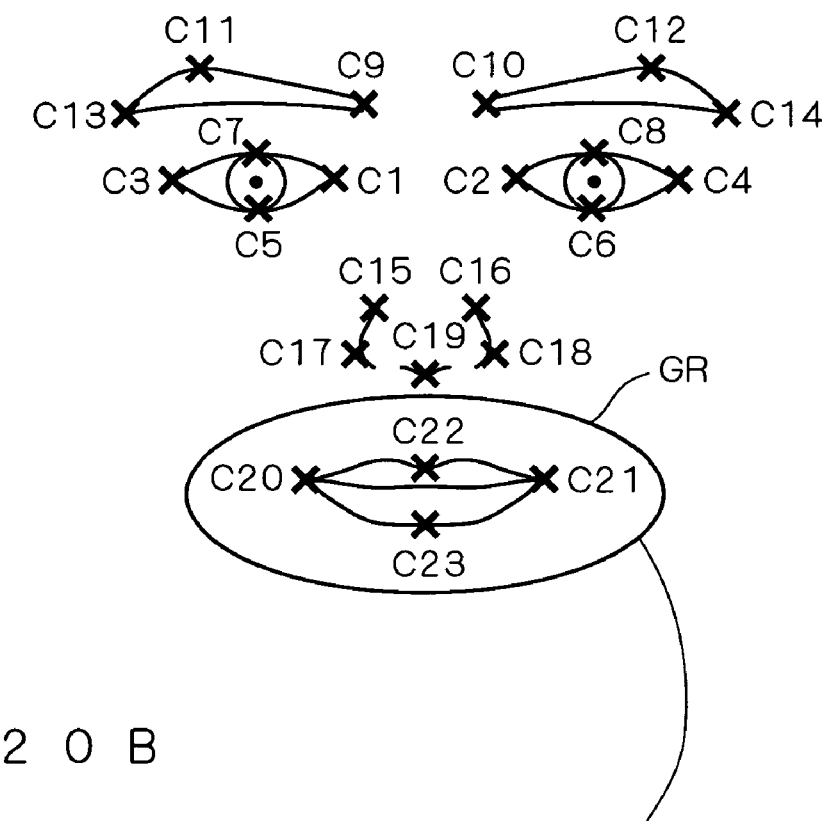
FIGS. 20A and 20B are diagrams showing individual control points of a feature part after normalization.
Figure 20B:
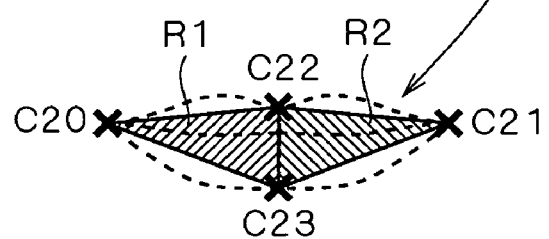

The local two-dimensional information is configured as, for example, brightness information of pixels of each local region including individual control points of a feature part after normalization such as a region constructed by a group GR in FIG. 20A (including a patch R1 having, as apexes, individual control points C20, C22, and C23 and a patch R2 having, as apexes, individual control points C21, C22, and C23), an area constructed only by a single patch, or the like. The local two-dimensional information $h^{(u)}$ (u=1, ..., and L; L is the number of local regions) is expressed in a vector form as shown by Equation (16) when the number of pixels in the local region is "n" and brightness values of the pixels are BR1, ..., and BRn. Information obtained by collecting the local two-dimensional information $h^{(u)}$ in L local regions is also expressed as overall two-dimensional information.

$$h^{(u)} = (BR1, \ldots, BRn)^T \quad (16)$$

(u=1, ..., L)

As described above, in step SP8, the three-dimensional shape information (three-dimensional information) and the texture information (two-dimensional information) is extracted as information indicating a feature of an individual model.

The extracted information is used for authenticating operation which will be described later (steps SP10 and SP11). The authenticating operation may be performed using information obtained by Equation (16) as it is. However, when the number of pixels in a local region is large, the calculation amount in the authenticating operation becomes very large. In the embodiment, therefore, to efficiently perform the authenticating operation by reducing the calculation amount, the information obtained by Equation (16) is compressed, and the authenticating operation is performed using the compressed information.

In the following step SP9, an information compressing process, which will be described below, for converting the information extracted in step SP8 to information adapted to authentication is performed.

The information compressing process is performed by using similar methods on the three-dimensional shape information $h^S$ and each local two-dimensional information $h^{(u)}$. In the following, the case of performing the information compressing process on the local two-dimensional information $h^{(u)}$ will be described in detail.

The local two-dimensional information $h^{(u)}$ can be expressed in a basis-decomposition form as shown by Equation (17) using average information (vector) $h_{ave}^{(u)}$ of the local region preliminarily obtained from a plurality of sample face images and a matrix $P^{(u)}$ (which will be described below) expressed by a set of eigen vectors of the local region preliminarily calculated by performing KL expansion on the plurality of sample face images. As a result, a local two-dimensional face information amount (vector) $c^{(u)}$ is obtained as compression information of the local two-dimensional information $h^{(u)}$.

$$h^{(u)} = h_{ave}^{(u)} + P^{(u)} c^{(u)} \quad (17)$$

As described above, the matrix $P^{(u)}$ in Equation (17) is calculated from a plurality of sample face images. Concretely, the matrix $P^{(u)}$ is calculated as a set of some eigen vectors (basis vectors) having large eigen values among a plurality of eigen vectors obtained by performing the KL expansion on the plurality of sample face images. The basis vectors are stored in the basis vector database 29. When a face image is expressed by using, as basis vectors, eigen vectors showing greater characteristics of the face image, the features of the face image can be expressed efficiently.

For example, the case of expressing local two-dimensional information $h^{(GR)}$ of a local region constructed by a group GR shown in FIG. 20A in a basis-decomposition form will be considered. When it is assumed that a set P of eigen vectors in the local region is expressed as P=(P1, P2, P3) by three eigen vectors P1, P2, and P3, the local two-dimensional information $h^{(GR)}$ is expressed as Equation (18) using average information $h_{ave}^{(GR)}$ of the local region and the set of eigen vectors P1, P2, and P3. The average information $h_{ave}^{(GR)}$ is a vector obtained by averaging a plurality of pieces of local two-dimensional information (vectors) of various sample face images on a corresponding pixel unit basis. As the plurality of sample face images, it is sufficient to use a plurality of standard face images having proper variations.

$$h^{(GR)} = h_{ave}^{(GR)} + (P1 \quad P2 \quad P3) \begin{pmatrix} c1 \\ c2 \\ c3 \end{pmatrix} \quad (18)$$

Equation (18) shows that the original local two-dimensional information can be reproduced by face information $c^{(GR)} = (c1, c2, c3)^T$. That is, the face information $c^{(GR)}$ is information obtained by compressing the local two-dimensional information $h^{(GR)}$ of the local region constructed by the group GR.

Although the local two-dimensional face information $C^{(GR)}$ obtained as described above may be used as it is for the authenticating operation, in the embodiment, the information is further compressed. Concretely, a process of converting a feature space expressed by the local two-dimensional face information $c^{(GR)}$ to a subspace which increases the differences among persons is performed. More specifically, a transformation matrix A is used which reduces the local two-dimensional face information $c^{(GR)}$ of vector size "f" to the local two-dimensional feature amount $d^{(GR)}$ of vector size "g" as shown by Equation (19). As a result, the feature space expressed by the local two-dimensional face information $c^{(GR)}$ can be transformed to a subspace expressed by the local two-dimensional feature amount $d^{(GR)}$. Thus, the differences in information among persons are made conspicuous.

$$d^{(GR)} = A^T c^{(GR)} \quad (19)$$

The transformation matrix A is a matrix having a size of f×g. By selecting "g" pieces of main components having a high radio (F radio) between a between-class variance and a within-class variance from a feature space by using the MDA (Multiple Discriminant Analysis) method, the transformation matrix A can be determined.

By executing processes similar to the information compressing process performed on the local two-dimensional information $h^{(GR)}$ on all of the other local regions, local two-dimensional face feature amounts $d^{(u)}$ of the local regions can be obtained. By applying a similar method on the three-dimensional shape information $d^S$, the three-dimensional face feature amount $d^S$ can be obtained.

A face feature amount "d" obtained by combining the three-dimensional face feature amount $d^S$ and the local two-dimensional face feature amount $d^{(u)}$ calculated in the step SP9 can be expressed in a vector form as shown by Equation (20).

$$d = \begin{pmatrix} d^S \\ d^{(1)} \\ \vdots \\ d^{(L)} \end{pmatrix} \quad (20)$$

In the above-described processes in steps SP1 to SP9, the face feature amount "d" (Bd) of the object is obtained from the input face images G1 and G2 of the person HMb to be authenticated. The face feature amount d(Bd) of the person HMb to be authenticated is used in the processes of steps SP10 and SP11 together with a feature amount d(Ad) of a face image of a registered person HMa to be described later.

Process of Performing Collation between Registered Person and Person to be Authenticated, and the Like (Steps SP10 and SP11)

In the embodiment, it is assumed that operation of calculating the feature amount d(Ad) of a face image of the registered person HMa is performed prior to step SP1, and the result (feature amount Ad or the like) of the process performed on the registered person HMa is preliminarily registered in the person database 30. For example, the feature amount d(Ad) of a face image of the registered person HMa is calculated by an operation similar to the operation of calculating a feature amount d(Bd) of a face image of the person HMb to be authenticated. That is, by performing processes similar to the processes (SP1 to SP9) for the person HMb to be authenticated onto the registered person HMa, the feature amount d(Ad) of the registered person HMa can be also calculated.

Referring again to FIG. 6, the processes in step SP10 and subsequent steps will be described.

In the following steps SP10 and SP11, face authentication is performed using the two face feature amount Ad and Bd.

Concretely, overall similarity Re as similarity between a person to be authenticated (an object to be authenticated) and a person to be compared (an object to be compared) is calculated (step SP10). After that, an operation for performing comparison between the person to be authenticated and the person to be compared on the basis of the overall similarity Re is performed (step SP11). The overall similarity Re is calculated using proper weight factors WT and WS specifying weights on three-dimensional similarity $Re^S$ and local two-dimensional similarity $Re^{(u)}$ (hereinbelow, also simply called "weight factors") in addition to the three-dimensional similarity $Re^S$ calculated from the three-dimensional face feature amount $d^S$ and local two-dimensional similarity $Re^{(u)}$ calculated from the local two-dimensional face feature amount $d^{(u)}$ (refer to Equation (21)).

$$WT+WS=1 \text{(where } WT \geq 0, WS \geq 0\text{)} \quad (21)$$

In step SP10, similarity evaluation is conducted between the face feature amount (comparison feature amount) d(Ad) of a person to be compared, which is pre-registered in the person database 30 and the face feature amount d(Bd) of the person to be authenticated, which is calculated by the steps SP1 to SP9. Concretely, the similarity calculation is executed between the registered face feature amount (comparison feature amount) ($d^{SM}$ and $d^{(u)M}$) and the face feature amount ($d^{SI}$ and $d^{(u)I}$) of the person to be authenticated, and the three-dimensional similarity $Re^S$ and the local two-dimensional similarity $Re^{(u)}$ is calculated.

The three-dimensional similarity $Re^S$ between the person to be authenticated and the person to be compared is obtained by calculating Euclidean distance $Re^S$ between corresponding vectors as shown by Equation (22).

$$Re^S = (d^{SI} - d^{SM})^T (d^{SI} - d^{SM}) \quad (22)$$

The local two-dimensional similarity $Re^{(u)}$ is obtained by calculating Euclidean distance $Re^{(u)}$ of each of vector components of the feature amounts in the corresponding local regions as shown by Equation (23).

$$Re^{(u)} = (d^{(u)I} - d^{(u)M})^T (d^{(u)I} - d^{(u)M}) \quad (23)$$

As shown in Equation (24), the three-dimensional similarity $Re^S$ and the local two-dimensional similarity $Re^{(u)}$ are combined by using predetermined weight factors WT and WS. In such a manner, the overall similarity Re as an index value of similarity between the person to be authenticated (object to be authenticated) and the person to be compared (object to be compared) is obtained.

$$Re = WT \cdot Re^S + WS \cdot \sum_{u=1}^{L} Re^{(u)} \quad (24)$$

In step SP11, authentication determination (individual identifying process) is performed on the basis of the overall similarity Re. Concretely, by comparing the similarity Re between the face feature amount of the person HMb to be authenticated and the face feature amount of a specific registered person HMa (person to be compared) with a predetermined threshold TH1, whether the person HMb to be authenticated is the same as the person HMa to be compared or not is determined. Specifically, when the similarity Re is smaller than the predetermined threshold TH1, the degree of similarity between the person to be authenticated and the person to be compared is regarded as high, and it is determined that the person to be authenticated is the same as the person to be compared. Although the case of determining the similarity Re by Equation (24) has been described, the invention is not limited to the case. For example, the inverse of the right side of Equation (24) may be set as similarity Re. The other similarities $Re^S$, $Re^{(u)}$, and the like are similar to the above.

As described above, in the operations of the embodiment, a plurality of pieces of measurement data are obtained by measurement of a plurality of times on the person HMb to be authenticated. On the basis of the plurality of pieces of measurement data, a standard model is deformed so as to optimize the total energy E (evaluation function), and a stereoscopic model (individual model) of the person HMb to be authenticated is generated. Consequently, even if any of the plurality of pieces of the measurement data has insufficient accuracy, the insufficient accuracy can be compensated by the other measurement data. Thus, high-accuracy modeling can be performed stably. That is, modeling accuracy can be improved.

Since the total energy E (evaluation function) (specifically, an evaluation value by the evaluation function) is obtained by using a weight according to the reliability ρ of each of the plurality of pieces of measurement data, modeling accuracy can be further improved.

Further, the individual identifying process on an object is performed on the basis of a stereoscopic model which is modeled more accurately, so that accuracy in the individual identifying process can be improved.

4. Modifications

Although the embodiment of the present invention has been described above, the invention is not limited to the above description.

For example, the case of determining whether an input face (the face of a person to be authenticated) is that of a specific registered person or not has been described in the foregoing embodiment, but the invention is not limited to the case. The idea may be applied to an identifying process for determining a person who is identical with a person to be authenticated from a plurality of registered persons. For example, it is sufficient to calculate all of similarities between face feature amounts of a plurality of persons registered and face feature amounts of a person to be authenticated and determine the identification between each of the persons to be compared (registered persons) and the person to be authenticated. In the case where it is sufficient to narrow a plurality of persons to be compared to a specific number of persons, the specific number of persons to be compared may be selected in decreasing order of the identification from the plurality of persons to be compared.

Although the model fitting operation is started after performing a predetermined number (Nk times) of measuring operations in the foregoing embodiment, the invention is not limited to the embodiment. Specifically, the model fitting may be started at the time point when the total sum value of the reliability ρk of each measurement time becomes equal to or larger than a predetermined threshold THv. Equation (25) may be used as a model fitting start condition.

$$\sum_k \rho_k \geq THv \quad (25)$$

Figure 21:
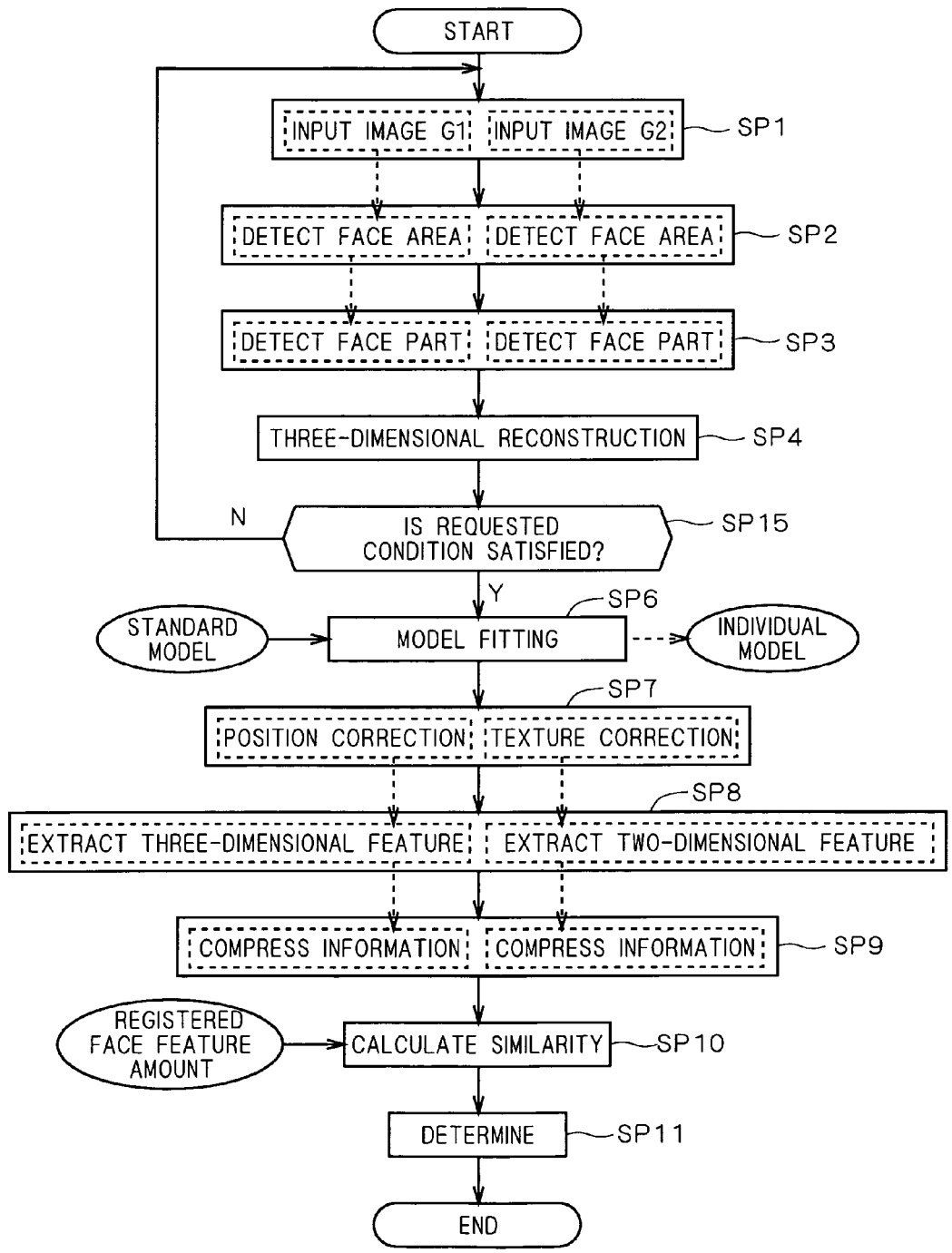
FIG. 21 is a flowchart of a modification.

FIG. 21 is a flowchart related to such a modification. FIG. 21 is different from FIG. 6 with respect to the point that step SP15 is provided in place of step SP5. In FIG. 21, in step SP15, whether the condition of Equation (25) is satisfied or not is determined. When the condition is not satisfied, the operations in steps SP1 to SP4 are repeated again. When the condition is satisfied, the program advances to the next model fitting operation (step SP6). In such a manner, when a predetermined degree of reliability cannot be obtained, it is unnecessary to perform useless model fitting operation, comparing and determining process, and the like (steps SP6 to SP11). Thus, efficient modeling operation can be performed using high-reliability measurement data.

Although the case of performing the model fitting operation by using measurement data of all of measurement times has been described in the foregoing embodiment, the invention is not limited to the case. For example, measurement data used for the model fitting operation may be selected as shown in FIG. 22.

Figure 22:
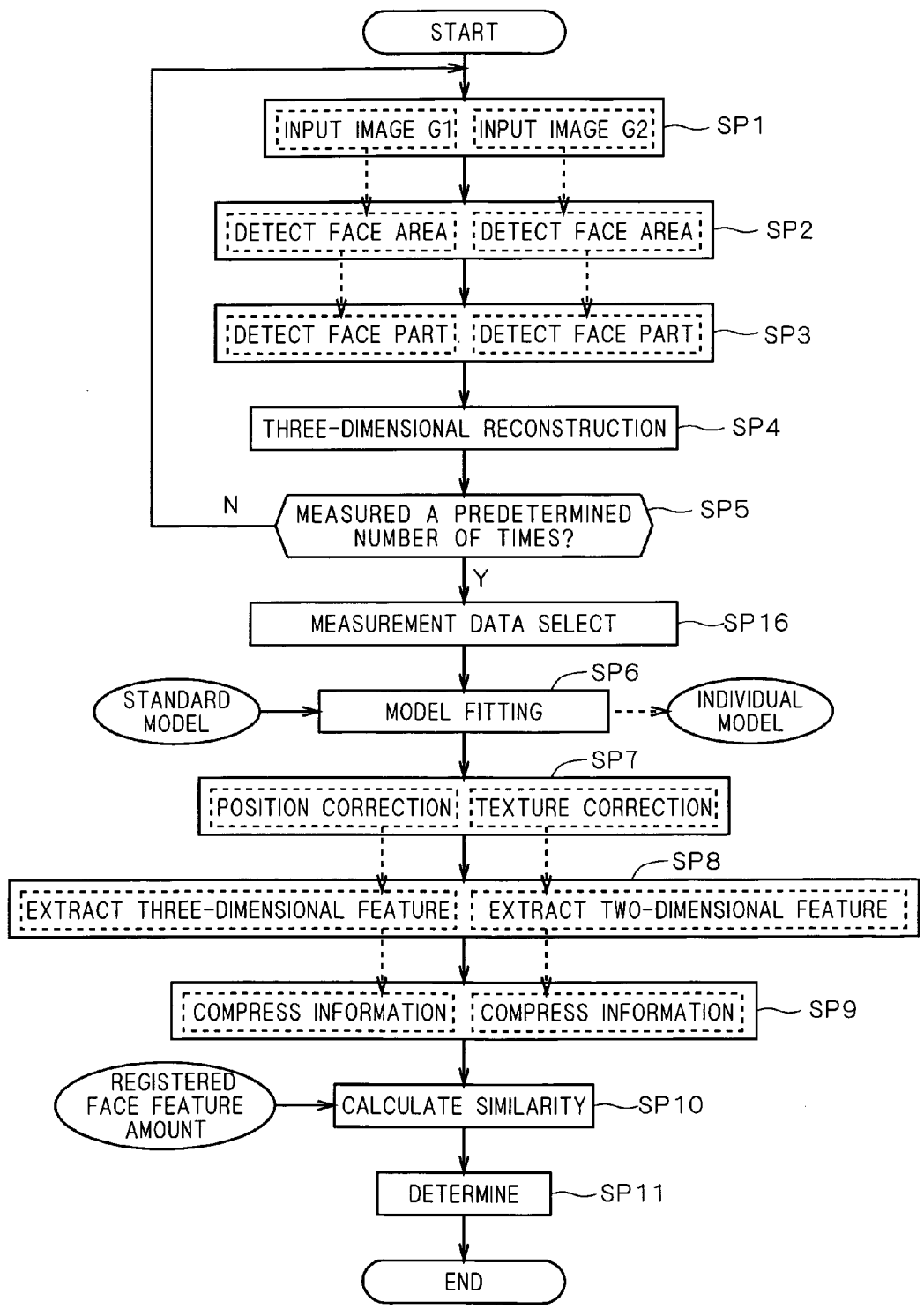
FIG. 22 is a flowchart showing another modification.

A modification of FIG. 22 is different from FIG. 6 with respect to the point that step SP16 is further provided between steps SP5 and SP6. In step SP16, measurement data used for the model fitting operation is selected from measurement data of a plurality of times. Concretely, measurement data of a measurement time in which the total sum value of reliability ρk satisfies a predetermined criterion as shown by Equation (25) is selected from measurement data of a plurality of times, and the model fitting is performed using the selected measurement data. In such a manner, efficient modeling operation can be performed using high-reliable measurement data.

Figure 23:
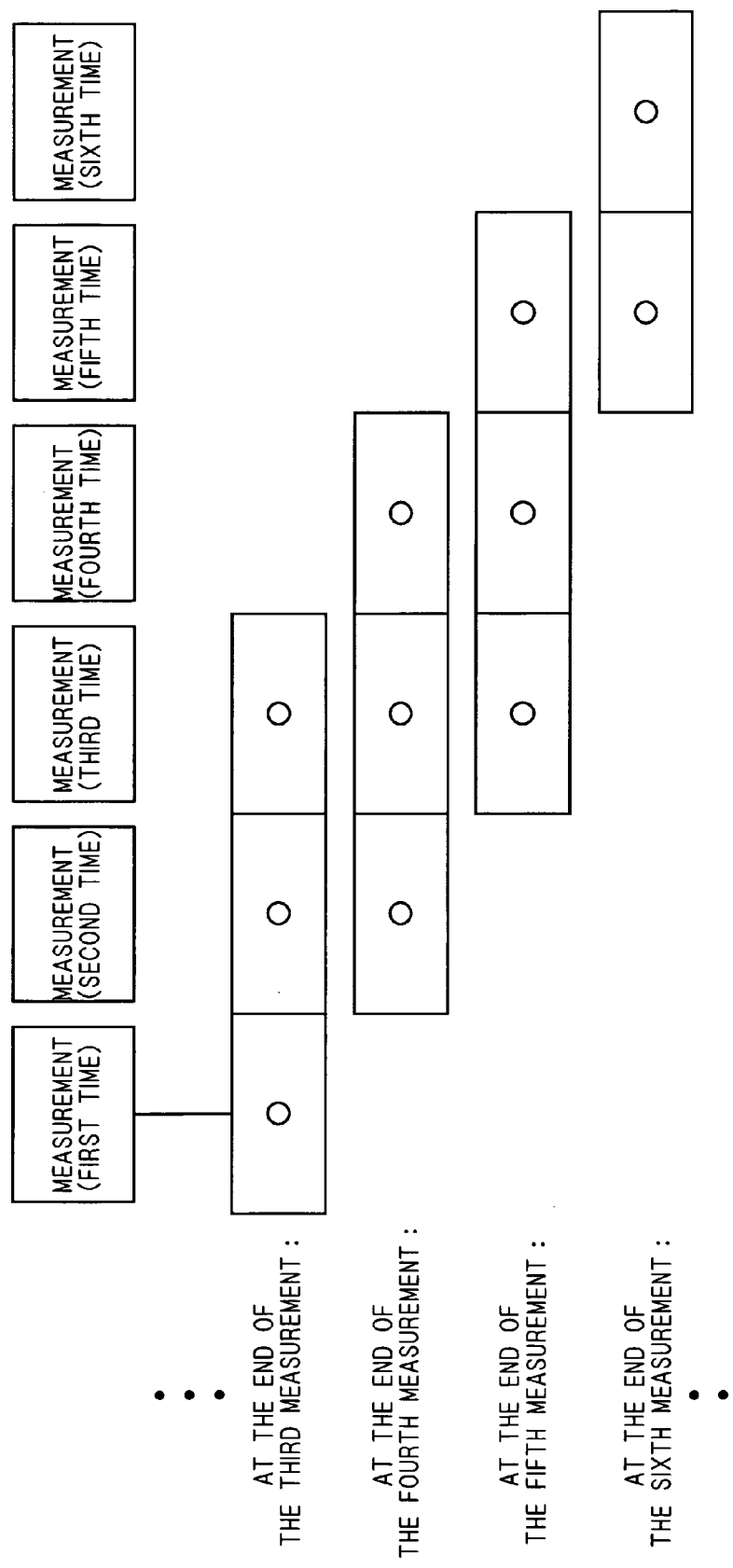
FIG. 23 is a diagram showing an example of selection of measurement data.

More specifically, as shown in FIG. 23, it is sufficient to select measurement data of a certain number of preceding times, in which the condition of Equation (25) is satisfied, in the reverse order from the latest measurement time. Concretely, at the time point when the k-th measuring operation is performed, the model fitting process is not performed with all of measurement data from the k-th time to the first time. When a condition such that the sum of the reliability ρk of k0 measurement times from the k-th measurement time to the (k−k0+1) measurement time is larger than a predetermined value THv is satisfied, it is sufficient to employ measurement data of the k0 measurement times from the k-th time to the (k−k0+1) time. For example, when k=5, k0=3, and the condition of Equation (25) is satisfied, it is sufficient to employ only measurement data of total three times; measurement of the fifth time, measurement of the fourth time, and measurement of the third time. When k=6, k0=2, and the condition of Equation (25) is satisfied, it is sufficient to employ only measurement data of total twice; measurement of the sixth time and measurement of the fifth time.

Figure 24:
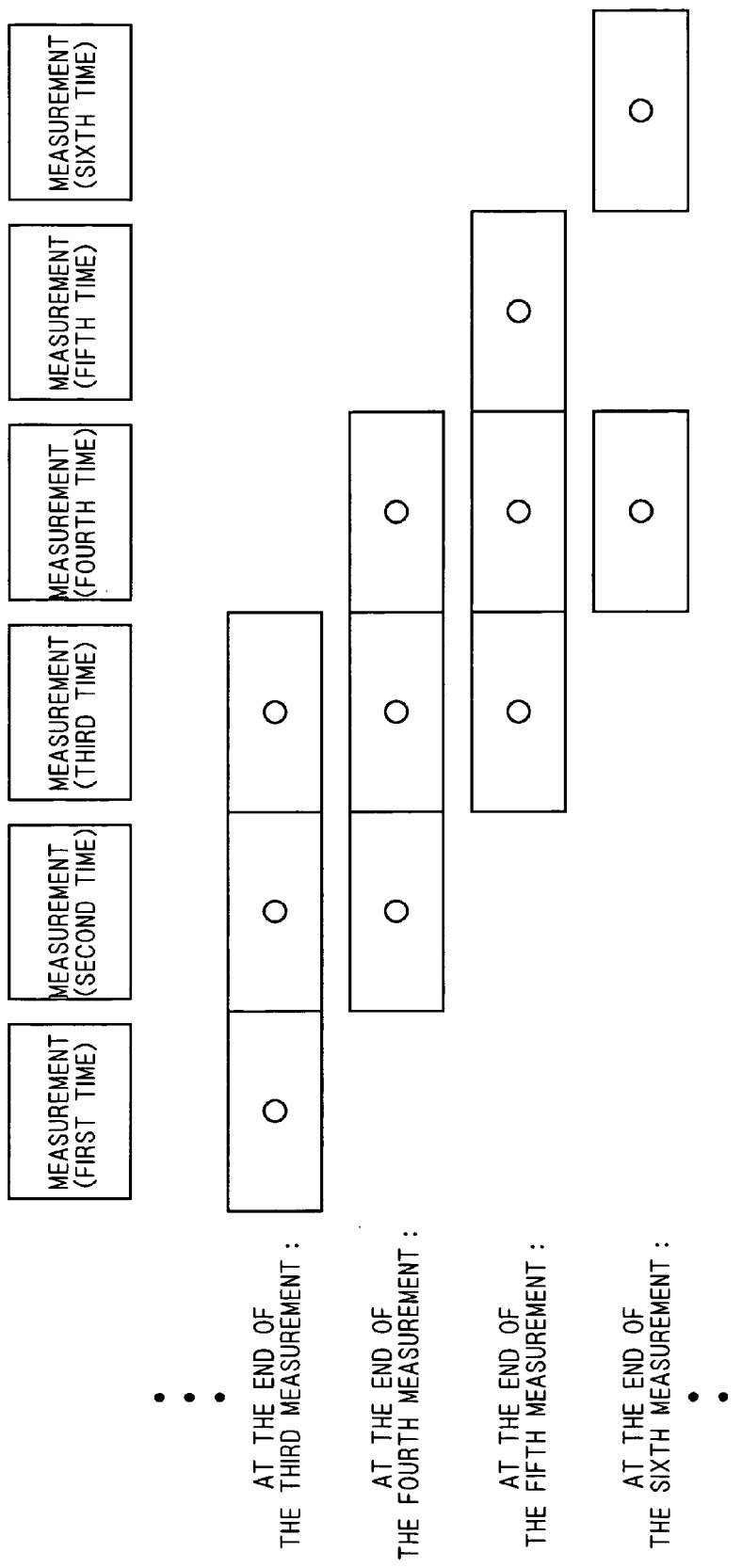
FIG. 24 is a diagram showing another example of selection of measurement data.

Alternatively, as shown in FIG. 24, it is sufficient to select measurement data of the minimum number of times from the descending order of the reliability ρk. For example, when ρ6>ρ4>ρ5>ρ3>ρ1>ρ2 and a condition such that the sum of ρ6 having the highest reliability (reliability of measurement data of the sixth time) and ρ4 having the next highest reliability (reliability of measurement data of the fourth time) among a plurality of reliabilities ρk is larger than the predetermined value THv (the condition of Equation (25)) is satisfied at the time point when the measurement operation of the sixth time is performed, only the measurement data of the fourth time and the measurement data of the sixth time may be selected.

The condition of Equation (25) may not be considered. For example, in the case of always employing measurement data of a predetermined number of times, measurement data of the predetermined number of times may be selected from a measurement time having the highest reliability. For example, measurement data of total three times from the first (highest) reliability to the third reliability may be always selected.

Further, the case where the threshold THv is a predetermined value in the modification using Equation (25) has been described above, the invention is not limited to the case. For example, the threshold THv may be always changed in accordance with the number Ns of recognition success times and the number Nf of recognition failure times in the individual identifying process (face authenticating process). Specifically, a value as shown in the right side of Equation (26) may be employed as the threshold THv. The model fitting may be performed using measurement data whose sum of reliability is equal to or larger than the threshold value shown in the right side of Equation (26).

$$THv = \frac{b3 \times Nf + b4}{b1 \times Ns + b2} \qquad (26)$$

Herein, b1, b2, b3, and b4 are constants (all of the constants are positive).

In Equation (26), by changing the threshold in accordance with success or failure of recognition, a proper threshold can be set. Concretely, the larger the number Ns of recognition success times is, the smaller the threshold is. The larger the number Nf of recognition failure times is, the larger the threshold is.

In the case where the number Ns of recognition success times is relatively large, there is the possibility that more than necessary measurement data is employed. In Equation (26), the larger the number Ns of recognition success times is, the smaller the threshold is. Consequently, the condition of Equation (25) is satisfied more easily also by measurement data of a relatively small number of measurement times, so that the number of pieces of data employed can be reduced. Therefore, the efficiency of the process can be improved.

On the other hand, when the number Nf of recognition failure times is relatively large, there is the possibility that high-reliable information is insufficient. In Equation (26), when the number Nf of recognition failure times is large, by increasing the threshold to make the condition of Equation (25) less easily satisfied, the number of data employed can be increased. Therefore, the accuracy of the process can be improved.

Such a modification can be applied to the (above-described) identifying process of determining a registered person who is the same as a person to be authenticated from a plurality of registered persons, and the like. It is sufficient to determine success/failure of recognition by, for example, determining "success" when the person to be authenticated is identical with any one of a plurality of registered persons and determining "failure" when the person to be authenticated is not identical with any one of the plurality of registered persons.

Such a modification can be also applied at the time of adjusting the face authentication system 1. In this case, for example, the threshold THv can be set to a proper value when a person enters success or failure of recognition as teaching data.

Although the identification between a person to be authenticated and a registered person is determined by using not only texture information but also shape information as shown in Equation (24) in the foregoing embodiment, the invention is not limited to the method. The identification between a person to be authenticated and a registered person may be determined by using only the texture information.

Although the case of solving the partial differential equations and accordingly deforming a standard model in the model fitting process has been described in the foregoing embodiment, the invention is not limited to the case. For example, a standard model may be gradually deformed by repeating, in step SP62 (FIG. 7), operation of calculating each of values of the total energy E when control points in a standard model are sequentially moved by predetermined amounts in a plurality of directions (for example, all of directions (26 directions) in a three-dimensional space) and moving the control points in the direction corresponding to the minimum value (that is, in the direction of minimizing the total energy E).

Although the case where the external energy Fe is expressed by Equation (5) has been described in the foregoing embodiment, the invention is not limited to the case. For example, the external energy Fe may be expressed by Equation (27) using the distance between a point Qj_ave derived by performing the weighted averaging on j-th feature points Qjk (coordinate values) in respective measurement times in accordance with the reliability ρ (ρjk or ρk) and a point Hj corresponding to each of the points Qj_ave. The point Qj_ave is also expressed as a point obtained by performing the weighted averaging on results Qjk of a plurality of measurement times with respect to the same feature point (the j-th feature point) by using a weight factor Wk (for example, Wk=ρk).

$$Fe = \frac{\alpha}{N_j} \times \sum_{j=1}^{N_j} |H_j - Q_{j\_ave}| \qquad (27)$$

$$\text{where } Q_{j\_ave} = \frac{\sum_{k=1}^{N_k} (W_k \cdot Q_{jk})}{\sum_{k=1}^{N_k} W_k}$$

FIG. 25 is a conceptual diagram showing such a modification. Concretely, as shown in FIG. 25, a point Qj_ave is obtained by correcting the measurement position (vector Qjk (Qj(k)) of the same feature point in measurement data of a plurality of times with a weight (for example, Wk=ρk) according to the reliability ρ (ρjk or ρk). Next, a standard model is deformed so as to minimize the external energy in Equation (27) using the distance between the point Qj_ave and the point Hj. In such a manner, the standard model is deformed so that the point Hj on the outline of the standard model becomes closer to the point Qj_ave, and effects similar to those of the foregoing embodiment can be obtained.

Although the case where the external energy Fe is expressed by Equation (5) including the projection point Hjk has been described in the embodiment, the invention is not limited to the case. For example, the external energy Fe may be expressed by Equation (28) using the square of the distance between each of the feature points Qjk and the control point Cj corresponding to the feature point Qjk.

$$Fe = \frac{\alpha}{N_k} \sum_{k=1}^{N_k} \frac{1}{N_j} \sum_{j=1}^{N_j} (W_{jk} \times |C_j - Q_{jk}|) \qquad (28)$$

By minimizing (optimizing) the external energy Fe, deformation is performed so as to shorten the distance between each of the control points Cj and the corresponding point Qj (that is, each of the control points Cj becomes closer to the corresponding point Qj).

The external energy Fe is an energy term which is optimized when the distance between each of the control points Cj in a standard model and the corresponding point Qj in measurement data is shortened. This type of external energy Fe also includes an element reflecting the relation between the measurement position of each feature point and the standard model, and plays the role of making the shape of the standard model close to the outline in the measurement data.

Alternatively, the external energy Fe may be expressed by Equation (29) using the distance between each of the points Qj_ave and a control point Cj corresponding to the point Qj_ave.

$$Fe = \frac{\alpha}{N_j} \times \sum_{j=1}^{N_j} |C_j - Q_{j\_ave}| \qquad (29)$$

Although it is a precondition that measurement results of all of feature points are obtained by measurement of each time in the foregoing embodiment, the invention is not limited to the embodiment. For example, data of a specific feature point (measurement point) may not be obtained in measurement of a certain time but may be obtained by measurement in a different measurement point. In such a case, for example, in Equations (5) and (6), it is sufficient to execute computation in the parenthesis only on data actually measured each measurement time and use the number of measurement points of each measurement time as the number Nj of measurement points.

Although three-dimensional information of the face of a person to be authenticated is obtained by using a plurality of images input from a plurality of cameras in the foregoing embodiment, the invention is not limited to the embodiment. Concretely, three-dimensional information of the face of a person to be authenticated may be obtained by using a three-dimensional shape measuring device constructed by a laser beam emitter L1 and a camera LCA as shown in FIG. 26 and measuring reflection light of a laser emitted from the laser beam emitter L1 by the camera LCA. In short, three-dimensional information may be obtained by the optical cutting method. By employing the method of obtaining three-dimensional shape information with an input device including two cameras as in the embodiment, three-dimensional shape information can be obtained with a relatively simpler configuration as compared with an input device using a laser beam.

Although the case of obtaining measurement data by the measuring device constructed by the cameras CA1 and CA2 in the face authentication system 1 has been described in the foregoing embodiment, the invention is not limited to the case. A plurality of pieces of measurement data obtained by measurement of another measuring system may be received and obtained via a network or the like.

Although the case of obtaining a standard model by reading the standard model stored in the storage 3 is assumed in the embodiment, the invention is not limited to the case. A standard model stored in another storage (such as a server computer) may be received and obtained via a network or the like.

Although the case of using a modeling result of model fitting for the face authenticating operation has been described in the foregoing embodiment, the invention is not limited to the case. For example, the modeling result may be used for other applications such as computer graphic.

What is claimed is:

1. A modeling system comprising:
    a standard model obtaining unit for obtaining a standard model as a standard three-dimensional model of an object;
    a data obtaining unit for obtaining a plurality of pieces of measurement data by measurement of a plurality of times performed on the object; and
    a model generating unit for generating a three-dimensional model of the object by deforming the standard model so as to optimize a predetermined evaluation function including an evaluation element on the plurality of pieces of measurement data,
    wherein the model generating unit generates the three-dimensional model by using some pieces of measurement data out of the plurality of pieces of measurement data, the sum of reliability of said some pieces of measurement data satisfying a predetermined criterion.

2. The modeling system according to claim 1, wherein the model generating unit corrects the evaluation element with a weight according to reliability of the plurality of pieces of measurement data and calculates the predetermined evaluation function.

3. The modeling system according to claim 2, wherein the model generating unit corrects the evaluation element with a weight according to reliability of each measurement time of the plurality of pieces of measurement data and calculates the predetermined evaluation function.

4. The modeling system according to claim 2, wherein the model generating unit corrects the evaluation element with a weight according to reliability of each measurement time on a measurement position of each feature point in the object and calculates the predetermined evaluation function.

5. The modeling system according to claim 4, wherein the evaluation element includes an element reflecting the relation between each measurement position of each measurement time on each feature point in the object and the standard model.

6. The modeling system according to claim 2, wherein the evaluation element includes an element reflecting the relation between each measurement position of each feature point in the object and the standard model, and
    the model generating unit calculates the predetermined evaluation function after correction of the measurement position of each feature point with a weight according to reliability of the plurality of pieces of measurement data.

7. The modeling system according to claim 2, wherein each of the plurality of pieces of measurement data is obtained on the basis of a plurality of images captured by a plurality of cameras, and
    the model generating unit calculates the predetermined evaluation function with a weight according to a correlation value of corresponding regions in the plurality of images as reliability of the plurality of pieces of measurement data.

8. The modeling system according to claim 2, wherein the model generating unit uses, as reliability of the plurality of pieces of measurement data, an element in which the degree of the reliability increases as a distance to the object is shortened, and calculates the predetermined evaluation function with a weight according to the element.

9. The modeling system according to claim 2, wherein the model generating unit uses, as reliability of the plurality of pieces of measurement data, an element in which the degree of the reliability increases as an amount of deviation from a reference posture of the object decreases, and calculates the predetermined evaluation function with a weight according to the element.

10. The modeling system according to claim 2, wherein the model generating unit uses, as reliability of the plurality of pieces of measurement data, an element in which the degree of the reliability increases as a change in position with time of each feature point in the object becomes smaller, and calculates the predetermined evaluation function with a weight according to the element.

11. The modeling system according to claim 1, wherein the model generating unit starts model generating operation on condition that the sum of reliability of the plurality of pieces of measurement data is equal to or larger than a predetermined threshold.

12. The modeling system according to claim 1, wherein the model generating unit generates the three-dimensional model on the basis of measurement data selected in descending order of reliability from the plurality of pieces of measurement data.

13. The modeling system according to claim 1, further comprising an identifying unit for performing an individual identifying process on the object on the basis of the three-dimensional model generated by the model generating unit.

14. The modeling system according to claim 13, wherein the model generating unit generates the three-dimensional model by using some pieces of measurement data out of the plurality of pieces of measurement data, sum of reliability of said some pieces of measurement data being equal to or larger than a predetermined threshold, and the predetermined threshold is changed on the basis of the number of successes and the number of failures in the individual identifying process.

15. The modeling system according to claim 1, wherein the measurement of the plurality of times is performed in a state where at least one relation out of a relation between a camera for measurement and the object, a relation between a light source and the object, and a relation between the light source and the camera for measurement is different in each of the times.

16. The modeling system according to claim 1, wherein the plurality of pieces of measurement data are obtained on the basis of a plurality of images captured by a plurality of cameras.

17. A modeling method comprising steps of:
a) obtaining a standard model as a standard three-dimensional model of an object;
b) obtaining a plurality of pieces of measurement data by measurement of a plurality of times performed on the object; and
c) generating a three-dimensional model of the object by deforming the standard model so as to optimize a predetermined evaluation function including an evaluation element on the plurality of pieces of measurement data,
wherein the three-dimensional model is generated by using some pieces of measurement data out of the plurality of pieces of measurement data, the sum of reliability of said some pieces of measurement data satisfying a predetermined criterion.

18. A computer software program stored on a tangible computer readable medium containing instructions executable by a computer for causing a computer to execute procedures of:
a) obtaining a standard model as a standard three-dimensional model of an object;
b) obtaining a plurality of pieces of measurement data by measurement of a plurality of times performed on the object; and
c) generating a three-dimensional model of the object by deforming the standard model so as to optimize a predetermined evaluation function including an evaluation element on the plurality of pieces of measurement data,
wherein the three-dimensional model is generated by using some pieces of measurement data out of the plurality of pieces of measurement data, the sum of reliability of said some pieces of measurement data satisfying a predetermined criterion.

* * * * *